United States Patent [19]

Nishikawa et al.

[11] Patent Number: 4,693,347
[45] Date of Patent: Sep. 15, 1987

[54] LOCK-UP CONTROL DEVICE FOR TORQUE CONVERTER IN AUTOMATIC TRANSMISSION FOR VEHICLE

[75] Inventors: Masao Nishikawa, Tokyo; Yoshimi Sakurai, Tanashi; Takashi Aoki, Fujimi; Yoichi Sato, Wako, all of Japan

[73] Assignee: Honda Giken Kogyo Kabushiki Kaisha, Tokyo, Japan

[21] Appl. No.: 839,259

[22] Filed: Mar. 13, 1986

Related U.S. Application Data

[62] Division of Ser. No. 551,739, Nov. 14, 1983, Pat. No. 4,589,537.

[30] Foreign Application Priority Data

Nov. 12, 1982 [JP] Japan ............................ 57-198504
Dec. 10, 1982 [JP] Japan ............................ 57-216355

[51] Int. Cl.$^4$ ...................... B60K 41/22; F16H 45/02
[52] U.S. Cl. .................................. 192/3.3; 192/3.31; 192/3.57
[58] Field of Search ............... 192/0.052, 0.076, 0.092, 192/3.29, 3.3, 3.31, 3.57, 103 R

[56] References Cited

U.S. PATENT DOCUMENTS

| | | | |
|---|---|---|---|
| 3,126,988 | 3/1964 | Memmer | 192/3.3 X |
| 3,128,642 | 4/1964 | Fisher et al. | 192/3.57 X |
| 3,262,523 | 7/1966 | Gordon | 192/3.57 X |
| 3,682,043 | 8/1972 | Bailey et al. | 192/3.57 X |
| 3,789,963 | 2/1974 | Bailey et al. | 192/3.57 |
| 3,857,302 | 12/1974 | Morris | 192/3.57 X |
| 3,985,046 | 10/1976 | Morris et al. | 192/3.57 X |
| 4,095,486 | 6/1978 | Ohnuma | 192/3.29 X |
| 4,441,385 | 4/1984 | Taga et al. | 192/3.31 X |
| 4,448,293 | 5/1984 | Maeda | 192/3.3 |
| 4,462,490 | 7/1984 | Hattori | 192/0.076 |
| 4,468,988 | 9/1984 | Hiramatsu | 192/103 R X |
| 4,476,970 | 10/1984 | Ito | 192/0.052 |

Primary Examiner—Rodney H. Bonck
Assistant Examiner—Richard M. Lorence
Attorney, Agent, or Firm—Armstrong, Nikaido, Marmelstein & Kubovcik

[57] ABSTRACT

In an automatic transmission for a vehicle, a lock-up device is provided for a direct coupling clutch. The automatic transmission includes a fluid type torque converter having a hydraulic direct coupling clutch, and an auxiliary transmission having plural stages of gear trains. The lock-up control device has a valve for controlling the supply of oil pressure from a common oil pressure source to the direct coupling clutch, the valve having a body movable between opposite end positions and adapted to take a first switch position at one of the end positions when applied with a single signal pressure and a second switch position at the other end position, after release of the signal pressure, due to resilient force of a spring. The valve allows flow of the actuating oil pressure to the direct coupling clutch when the valve body is at both the first and second switch positions and interrupts the flow during shifting movement of the valve body from the first to second positions or vice versa. Thus, the direct coupling clutch is instantaneously disconnected during gear shifting operation over adjacent three gear ratios with use of the single signal pressure.

4 Claims, 22 Drawing Figures

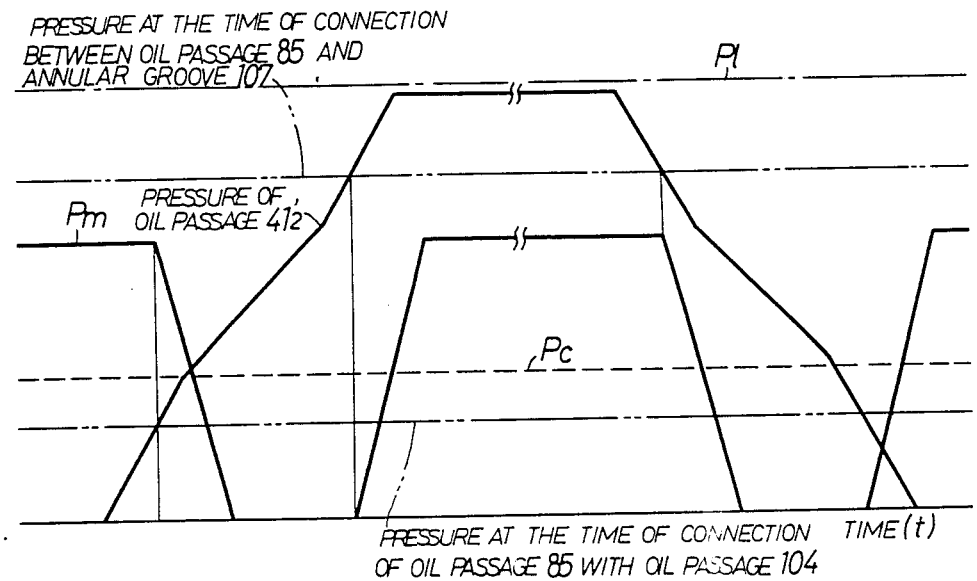
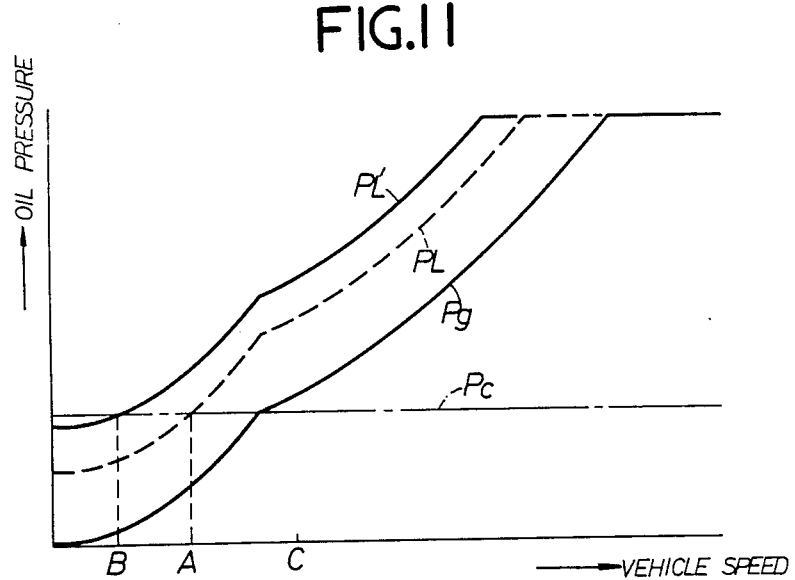

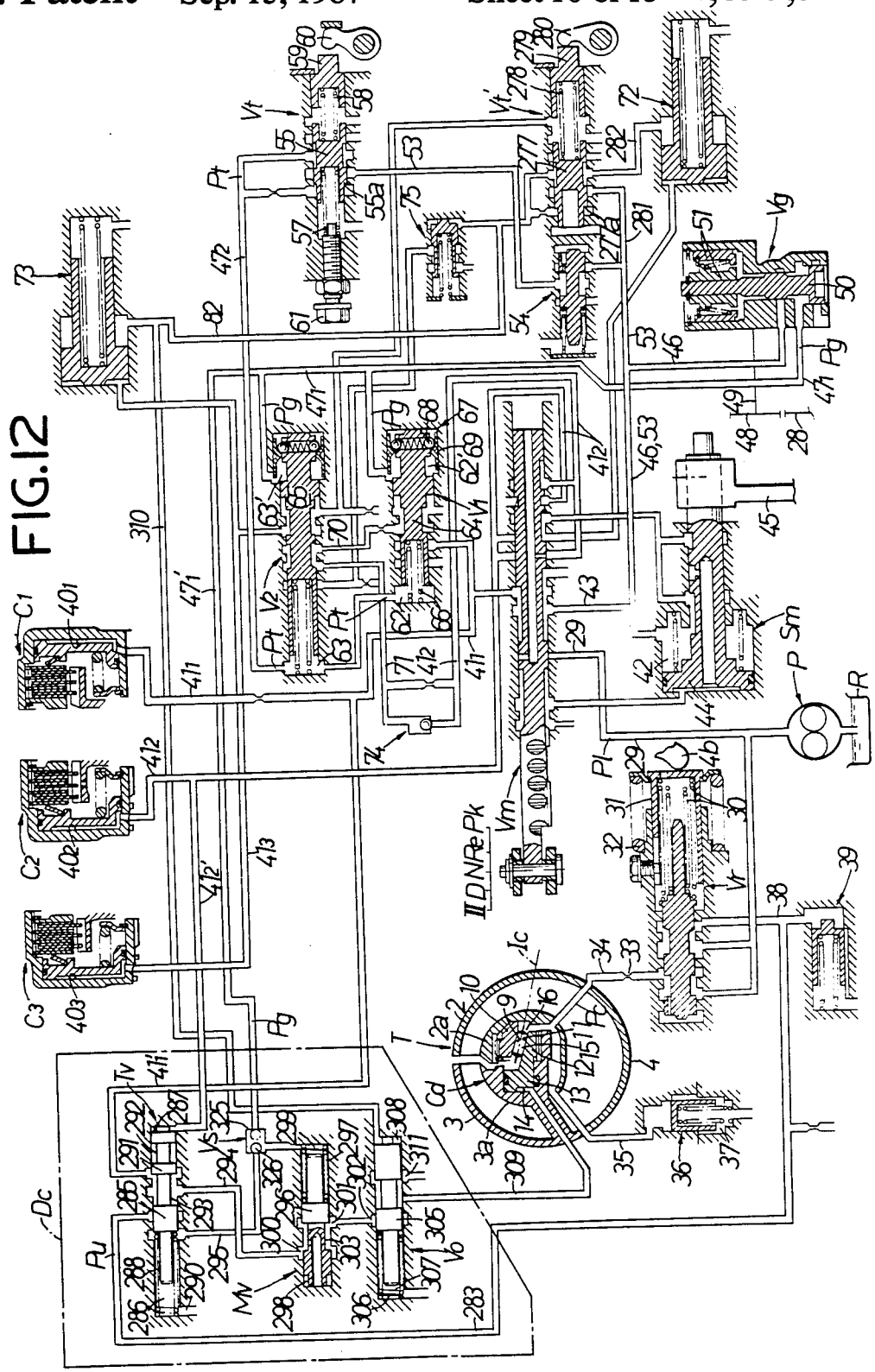

LOCK-UP CONTROL DEVICE FOR TORQUE CONVERTER IN AUTOMATIC TRANSMISSION FOR VEHICLE

This is a division, of application Ser. No. 551,739 filed Nov. 14, 1983 now U.S. Pat. No. 4,589,537.

BACKGROUND OF THE INVENTION

1. Field of the Invention

In an automatic transmission comprising a fluid type torque converter having an input member including a pump vane wheel and an output member including a turbine wheel, and an auxiliary transmission having one or more stages of gear trains, through which the torque of the output member is transmitted to a driving wheel, a lock-up control device for a torque converter in which a direct coupling clutch capable of mechanically coupling said input and output members is interposed therebetween to control the slip loss of the torque converter to the minimum.

2. Description of the Prior Art

When an accelerator pedal is released during the operation of the vehicle with the torque converter placed in a lock-up state by actuation of the direct coupling clutch, a sudden change in reaction applied to a power plant including the engine is transmitted to the vehicle body through the power plant and as a consequence, unpleasant surging tends to occur. It is effective to release the actuation of the direct coupling clutch at an idle position of an engine throttle valve in order to avoid the unpleasant surging. Various devices for that purpose have already been proposed.

A further means for solving this problem has already been proposed, in which means, a unidirectional clutch is interposed in series with the direct coupling clutch between the input and output members of the torque converter, said unidirectional clutch being designed so that at the time of operation of the direct coupling clutch, only the output torque of the engine may be transmitted towards the output member. In the idle condition of the engine throttle valve, vibration noises and wear due to the slip of the unidirectional clutch somewhat occur. If prevention of such occurrence of the noises or the like is taken into consideration, it is desirable to release the direct coupling clutch.

On the other hand, the applicant has already proposed an arrangement wherein for the purpose of maintaining the power performance during the operation of the direct coupling clutch, the slip characterisitc is imparted to the direct coupling clutch and the engaging force of the direct coupling clutch is controlled in accordance with the change in vehicle speed whereby during the maximum power output operation of the engine in a low vehicle speed zone, the slip is purposely created in the direct coupling clutch to thereby allot the transmission of output torque of the engine to a mechanical transmission system including the direct coupling clutch and a fluid transmission system including a fluid of the torque converter, thus suitably restoring a torque amplifying function of the torque converter, and in other words, power division of one kind is effected.

If an attempt is made to simultaneously effect the lock-up controls of different kinds, two valves are required, one valve for releasing the direct coupling clutch in the idle state of the engine throttle valve and the other for controlling the coupling force of the direct coupling clutch in accordance with the change in vehicle speed. If these can be controlled efficiently by a single valve, the device is materially simplified, and a leak loss of pressure oil from the valve is minimized, which is extremely advantageous in practical use.

SUMMARY OF THE INVENTION

It is therefore a first object of the present invention to provide a lock-up control device for said torque converter which is simple in construction and in which the lock-up controls of different kinds may be carried out by a single valve.

To achieve this object, the present invention is characterized by comprising a hydraulic direct coupling clutch having a slip characteristic provided between input and output members of a torque converter and capable of mechanically coupling said both members and a modulator valve disposed in an oil passage for connecting a hydraulic cylinder of said direct coupling clutch with an oil pressure source, said modulator valve being composed of a valve body for opening and closing said oil passage, a spring for biasing said vlave body in a valve-opening direction, a first oil pressure chamber for introducing pilot oil pressure for biasing said valve body in a valve-closing direction from an input port side of said modulator valve, and a second pilot oil pressure chamber for introducing pilot oil pressure for biasing said valve body in the valve-opening direction, wherein an output side of a device for generating oil pressure proportional to vehicle speed for releasing oil pressure which is changed proportional to the vehicle speed is connected through a throttle to said second pilot oil pressure chamber and a valve device for detecting the idle state of an engine throttle valve to release said second pilot oil pressure chamber to atmosphere is connected to said second pilot oil pressure chamber.

It is a second object of the present invention to provide a lock-up control device for said torque converter which is simple in construction and positive in operation and in which the torque converter can be locked up over three speed ratios adjacent to one another by a common control device, and at the time of speed change, said lock-up can be temporarily released to alleviate a shock at the time of speed change.

To achieve this second object, the present invention is characterized by the provision of an automatic transmission comprising a fluid type torque converter, a hydraulic direct coupling clutch provided between input and output members and capable of being actuated to mechanically coupling said both members, an auxilary transmission connected to said torque converter and having plural stages of gear trains, said auxiliary transmission capable of being changed in speed to a plurality of speed ratios by selection of said gear trains, and a control mechanism for automatically effecting the selection of gear trains of said auxiliary transmission in accordance with the running condition of the vehicle, said automatic transmission comprising signal pressure which is increased or reduced when one of said gear trains is selected so as to assume a certain speed ratio and which is conversely reduced or increased when the other of gear trains is selected so as to assume a speed ratio adjacent to the first-mentioned speed ratio, a lock-up actuating means for actuating said direct coupling clutch by common oil pressure even when either gear train is selected, and a release means for detecting a variation in said signal pressure to release the lock-up of said direct coupling clutch during a period of said variation.

Accordingly, if the oil pressure for establishing an intermediate speed stage gear train is used as a reference oil pressure of the lock-up actuating means, the actuation and relase of the direct coupling clutch can be controlled by the oil pressure for establishing a low-speed stage and high-speed stage gear train adjacent thereto, the torque converter can be locked up over three speed ratios, and the releasing can be effected at the time of twice of speed change therebetween. Of course, this can be also applied to the transmission which is provided with only two speed ratios.

Incidentally, where an actual control device for an automatic transmission is designed, it is advantageous, in terms of installation space and cost, to use an output of a speed-changing governor valve heretofore used, that is, governor pressure Pg, as signal pressure proportional to the vehicle speed. However, the characteristic of the governor pressure Pg is generally determined by a combination of the secondary parabola, and the rising speed of the governor pressure in a low-speed zone is high as shown in FIG. 11. This means that in the low-speed zone, as the vehicle speed lowers, the lock-up engaging force rapidly weakens. This is convenient because the lock-up state of the torque converter is released before the vehicle stops to avoid the engine stop (so-called "enst"). On the other hand, however, the characteristic of the governor pressure Pg has its own limitation for determining the speed change characteristic, and the characteristic of the governor pressure Pg cannot be determined freely in view of the fact that the torque converter is locked up. Accordingly, if a release point of the lock-up is brought to the lowspeed state as much as possible, there was a problem in that in the vehicle speed region above the release point, the engaging force of the direct coupling clutch is excessively strong to increase the vehicle vibrations. That is, in FIG. 11, where the governor pressure Pg is increased to form lock-up pressure PL, if the amount of said increment is increased to PL' in order to lock-up the torque converter from a lower speed, the lock-up start point determined by a point crossed with internal pressure Pc of the torque converter is shifted from vehicle speed A to vehicle speed B to be shifted to the lower speed side. However, in vehicle speed C which is the middle-speed zone, the engaging force of the torque converter increases and therefore, the vehicle vibration increases and poor power feeling results.

It is therefore a third object of the present invention to provide a lock-up control device for said torque converter which can considerably improve practical fuel cost without making sacrifices for others while solving the problem of vibration in the middle-speed zone and being made to be able to maintain the lock-up engaging force down to the low-speed zone, under the restriction that the existing speed-changing governor pressure is utilized.

To achieve this third object, the present invention is characterized by the provision of an automatic transmission comprising a fluid type torque converter having an input member and an output member to which the output of the engine is transmitted; a hydraulic direct coupling clutch provided between said input and output members and capable of being actuated to mechanically engage said both members; an auxiliary transmission connected to the output member of said torque converter and having plural stages of gear trains, said auxiliary transmission capable of being changed in speed to a plurality of speed ratios by selection of said gear trains; and a control mechanism having a governor valve for releasing governor pressure proportional to the vehicle speed and automatically selecting the gear train of said auxiliary transmission in accordance with the running condition of the vehicle; said automatic transmission comprising an oil pressure generating means for generating oil pressure at a substantially given level at all times during the operation of the engine; and a selection means for comparing the governor pressure from said governor valve with the generated oil pressure of said oil pressure generating means to select higher one of oil pressure, output pressure of said selection means being used as an index for controlling the engaging force of said direct coupling clutch.

Where the lock-up engaging force is made to be maintained down to a lower speed zone in accordance with the aforesaid third object, if said system is applied even to the speed change ratio (the first speed) of the low-speed stage, a switching valve for releasing the lock-up state becomes necessary in a level below a certain vehicle speed. Otherwise, the locking-up of the torque converter is effected even during the stoppage of the vehicle, and therefore, the engine is not operated smoothly and for the worst, the engine stop possibly occurs (in case of the power divison type, the engine stop does not always occur completely).

It is therefore a fourth object of the present invention to provide a lock-up control device for said torque converter in which in the state of speed change ratio of a low-speed stage, pressure with the governor pressure increased is used as the lock-up engaging pressure, and the characteristic wherein said governor pressure rapidly lowers as the vehicle speed lowers is utilized, whereby possible occurrence of the engine stop is eliminated even in the low-speed stage and the torque converter can be locked up without newly installing an exclusive-use switching valve which changes in switching mode in accordance with the vehicle speed.

To achieve this fourth object, the present invention is characterized by the provision of an automatic transmission comprising a fluid type torque converter having an input member and an output member to which the output of the engine is transmitted; a hydraulic direct coupling clutch provided between said input and output members and capable of being actuated to mechanically engage said both members; an auxiliary transmission connected to the output member of said torque converter and having plural stages of gear trains, said auxiliary transmission capable of being changed in speed to a plurality of speed ratios by selection of said gear trains; and a control mechanism having a governor valve for releasing governor pressure proportional to the vehicle speed and automatically selecting the gear train of said auxiliary transmission in accordance with the running condition of the vehicle; said automatic transmission comprising an oil pressure generating means for generating oil pressure at a substantially given level at all times during the operation of the engine; a selection means for comparing the governor pressure from said governor valve with the generated oil pressure of said oil pressure generating means to select higher one of oil pressure; and an interruption means interposed between said selection means and said oil pressure generating means to cut-off a connection between said selection means and said oil pressure generating means when the speed ratio of the low-speed stage is established, output pressure of said selection means being used as an index for controlling the engaging force of said direct coupling clutch.

The above and other objects, characteristics and advantages of the present invention will be further apparent from the description of preferred embodiments which will be explained in detail with reference to the drawings.

BRIEF DESCRIPTION OF THE DRAWINGS

FIGS. 1 to 4 show a first embodiment of the present invention, in which FIG. 1 is a schematic view as a whole of a transmission for an automobile with three stages of forward movement and one stage of backward movement, FIG. 2 is an oil pressure control circuit view of said automatic transmission including the device of the present invention, FIG. 2A is a developed view showing essential parts of a direct coupling clutch of FIG. 2, FIG. 3 is a characteristic curve of working oil pressure of the direct coupling clutch, FIG. 4 is a view showing the relation between the speed change characteristic and the zones showing the strength of the engaging force of the direct coupling cluch;

FIG. 8 is a characteristic curve showing the change in working oil pressure of the direct coupling cluch in FIG. 6 when the speed change is made;

FIG. 11 is an oil pressure characteristic curve for explanation of problems;

FIG. 12 is an oil pressure circuit view showing a sixth embodiment of the present invention;

DESCRIPTION OF THE PREFERRED EMBODIMENTS

Hereinafter, preferred embodiments of the present will be described in detail with reference to the accompanying drawings.

Figure 1:
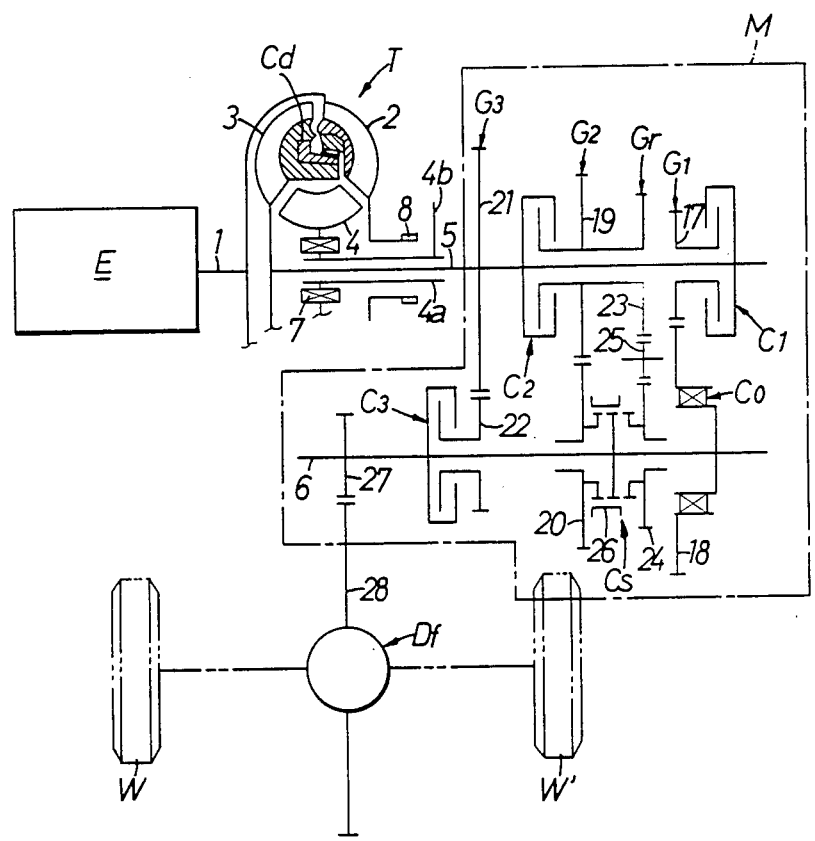

Prior to the explanation of a first embodiment of the present invention, FIG. 1 is a schematic view of an automatic transmission for a vehicle with three stages of forward movement and one stage of backward movement to which the present invention is applied. Referring to FIG. 1, the output of the engine E is transmitted, via a torque converter T, an auxiliary transmission M and a differential device Df in said order, from a crank shaft 1 to driving wheels W, W' to drive the latter.

The torque converter T comprises a pump vane wheel 2 connected to the crank shaft 1, a turbine vane wheel 3 connected to an input shaft 5 of the auxiliary transmission M, and a stator vane wheel 4 connected through a unidirectional clutch 7 to a stator shaft 4a relatively rotatably supported on the input shaft 5. The torque transmitted from the crank shaft 1 to the pump vane wheel 2 is transmitted to the turbine vane wheel 3 hydrodynamically, and when amplifying action of torque is effected during that period, the stator vane wheel 4 bears the reaction thereof.

Figure 2:
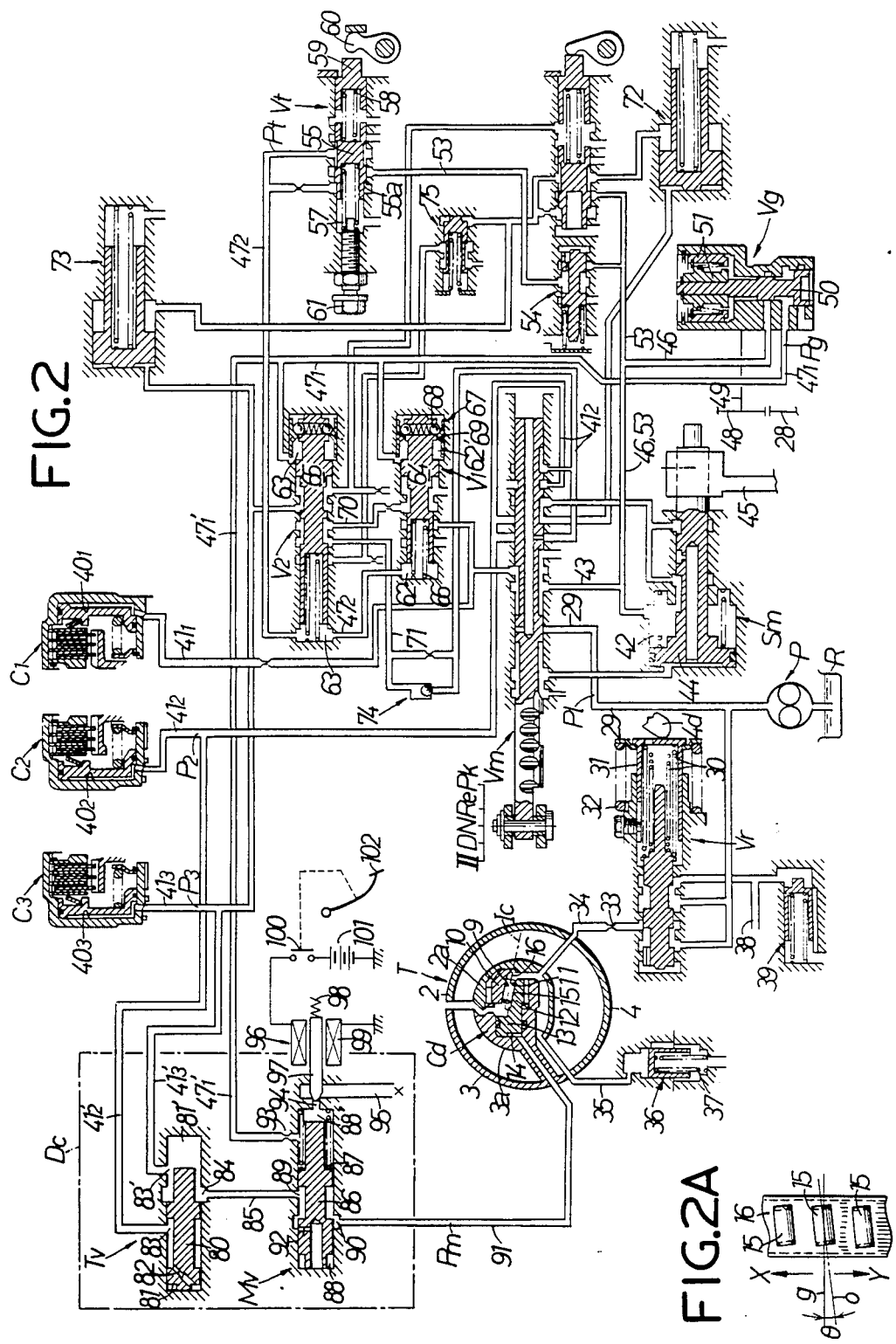

A pump driving gear 8 for driving an oil pressure pump P shown in FIG. 2 is provided on the right end of the pump vane wheel 2, and a stator arm 4b for controlling a regulator valve Vr shown in FIG. 2 is fixedly mounted on the right end of the stator shaft 4a.

Between the pump vane wheel 2 and the turbine vane wheel 3 is provided a roller type direct coupling clutch Cd capable of mechanically coupling the former. This will be described in detail with reference to FIG. 2 and FIG. 2A. An annular driving member 10 having a driving conical surface 9 in the inner circumference thereof is secured to the inner circumferential wall 2a of the pump vane wheel 2. A driven member 12 having a driven conical surface 11 parallel to and facing to said driving conical surface 9 in the outer circumference thereof is axially slidably spline-fitted in the inner circumferential wall 3a of the turbine vane wheel 3. The driven member 12 is formed at its one end integrally with a piston 13. The piston 13 is fitted into a oil pressure cylinder 14 provided on the inner circumferential wall 3a of the turbine vane wheel 3 to simultaneously receive internal pressure of the cylinder 14 and internal pressure of the torque converter T at both left and right ends thereof.

A columnar clutch roller 15 is interposed between the driving and driven conical surfaces 9, 11. The clutch roller 15 is retained by an annular retainer 16 in such a manner than the center axis o thereof is inclined by a fixed angle $\theta$ with respect to the cetner line g of a phantom conical surface Ic extending through the central portion between both the conical surfaces 9 and 11, as shown in FIG. 2A.

Accordingly, when oil pressure higher than internal pressure of the torque converter T is introduced into the oil pressure cylinder 14 at the stage wherein the torque amplifying function of the torque converter T becomes unnecessary, the piston 13, namely, the driven member 12 is urged towards the driving member 10. Thereby the clutch roller 15 is pressed against both the conical surfaces 9, 11 but when the driving member 10 is rotated by the output torque of the engine E in a direction as indicated by X in FIG. 2A with respect to the driven member 12, the clutch roller 15 revolves accordingly. However, this clutch roller 15 has its center axis inclined as previously mentioned, and therefore, said revolution imparts both the members 10, 12 a relative axial displacement to move them close to each other. As a consequence, the clutch roller 15 is cut into and between both the conical surfaces 9, 11 to mechanically couple between both members 10, 12, that is, between the pump vane wheel 2 and turbine vane wheel 3. If the output torque of the engine above the coupling force is applied between both the vane wheels 2, 3 even when the direct coupling clutch Cd is operated as described above, the clutch roller 15 produces a slip with respect to each of the conical surfaces 9, 11. Thereby said torque is divided into two parts, one torque being transmitted mechanically through the direct coupling clutch Cd, the other being transmitted hydrodynamically through both the vane wheels 2, 3, to form a variable rate power divisional system wherein the ratio of the former torque to the latter torque varies with a slip degree of the clutch roller 15.

When a reverse load is applied to the torque converter T during the operation of the direct coupling clutch Cd, the rotational speed of the driven member 12 exceeds the rotational speed of the driving member 10, and therefore, relatively, the driving member 10 is rotated in a direction as indicated by Y with respect to the driven member 12, as a consequence of which the clutch roller 15 revolves in a direction opposite the former to impart both the members 10, 12 a relative axial displacement for moving them apart from each other. As a result, the clutch roller 15 is released from its cutting into and between both the conical surfaces 9, 11, assuming the idle state. Thus, the transmission of the reverse load from the turbine vane wheel 3 to the pump vane wheel 2 is effected only hydrodynamically.

If the oil pressure of the oil pressure cylinder 14 is released, the piston 13 receives the internal pressure of the torque converter T and then moves back to its original position, whereby the direct coupling clutch Cd assumes an inoperative state.

Turning again to FIG. 1, a low-speed stage gear train $G_1$, a middle-speed stage gear train $G_2$, a high-speed stage gear train $G_3$ and a back-movement gear train Gr are provided in parallel between the input and output shafts 5, 6 parallel to each other of the auxiliary transmission M. The low-speed stage gear train $G_1$ comprises a driving gear 17 connected to the input shaft 5 through a low-speed stage clutch $C_1$ and a driven gear 18 connected to the output shaft 6 through a unidirectional clutch Co and meshed with said gear 17. The middle-speed stage gear train $G_2$ comprises a driving gear 19 connected to the input shaft 5 through a middle-speed stage clutch $C_2$ and a driven gear 20 connected to the output shaft 6 through a switching clutch Cs and meshed with said gear 19. The high-speed stage gear train $G_3$ comprises a driving gear 21 fixedly mounted on the input shaft 5 and a driven gear 22 connected to the output shaft 6 through a high-speed stage clutch $C_3$. The backward-movement gear train Gr comprises a driving gear 23 fromed integrally with the driving gear 19 of the middle-speed stage gear train $G_2$, a driven gear 24 connected to the output shaft 6 through the switching clutch Cs and an idle gear 25 meshed with both the gears 23, 24. The switching clutch Cs is disposed between the driven gears 20, 24, and the driven gears 20, 24 can be selectively connected to the output shaft 6 by shifting a selector sleeve 26 of the clutch Cs to a forward position on the lefthand or to a backward-movement position on the righthand in the figure.

If only the low-speed stage clutch $C_1$ is engaged when the selector sleeve 26 is retained at the forward position as shown, the driving gear 17 is connected to the input shaft 5 to establish the low-speed stage gear train $G_1$, through which gear train $G_1$, the torque is transmitted from the input shaft 5 to the output shaft 6. Next, when the middle-speed stage clutch $C_2$ is engaged while the low-speed stage clutch $C_1$ remains engaged, the driving gear 19 is connected to the input shaft 5 to establish the middle-speed stage gear train $G_2$, through which gear train $G_2$, the torque is transmitted from the input shaft 5 to the output shaft 6. During that period, the output shaft 6 rotates at a higher speed than that of the driven gear 18 of the low-speed train $G_1$ due to a difference in change gear ratio between the low-speed and middle-speed stage gear trains $G_1$, $G_2$, and therefore, the unidirectional clutch Co slips to render the low-speed stage gear train $G_1$ substantially out of operation. If the middle-speed stage clutch $C_2$ is interrupted and high-speed stage clutch $C_3$ is engaged while the low-speed stage clutch $C_1$ is engaged, the driven gear 22 is connected to the output shaft 6 to establish the high-speed stage gear train $G_3$, through which gear train $G_3$, the torque is transmitted from the input shaft 5 to the output shaft 6. Also in this case, the unidirectional clutch Co slips to render the low-speed stage gear train $G_1$ out of operation, similar to the time when the middle-speed stage gear train $G_2$ is established. Next, if the selector sleeve 26 is switched to the backward-movement position on the righthand and only the middle-speed stage clutch $C_2$ is engaged, the driving gear 23 and driven gear 24 are connected to the input shaft 5 and output shaft 6, respectively to establish the backward-movement gear train Gr, through which gear train Gr, the torque is transmitted from the input shaft 5 to the output shaft 6.

The torque transmitted to the output shaft 6 is transmitted from an output gear 27 provided on the end of said shaft 6 to a large-diameter gear 28 of the differential device Df.

FIG. 2 shows a combination of one example of an oil pressure circuit for controlling the operation of the low-speed, middle-speed and high-speed stage clutches $C_1$, $C_2$ and $C_3$ in FIG. 1 and one example of a control device Dc of the direct coupling clutch Cd in accordance with the present invention. In the figure, the oil pressure pump P sucks the oil from an oil tank R and feeds the oil under pressure into an operating oil passage 29. This pressure oil is regulated in pressure to a predetermined level by a regulator valve Vr, and thereafter fed to a manual valve Vm. This oil pressure is termed as the line pressure Pl.

The regulator valve Vr has a pressure regulating spring 30 and a spring receiving cylinder 31 for carrying an outer end thereof, and this spring receiving cylinder 31 can be moved to left and right to adjust the set load of the pressure regulating spring 30. The stator arm 4b comes into contact with the outer surface of the spring receiving cylinder 31 so as to apply the reaction force acting on the stator vane wheel 4, that is, the stator reaction force thereto. A stator spring 31 for carrying the stator reaction force is connected to the spring receiving cylinder 31. Accordingly, if the stator reaction force increases, the stator spring 32 is compressed, as a consequence of which the spring receiving cylinder 31 is moved leftwards to increase the set load of the pressure regulating spring 30 with the result that the oil pressure of the operating oil passage 29 is increased.

A part of pressure oil regulated by the regulator valve Vr is introduced into the torque converter T via an inlet oil passage 34 having a throttle 33 to pressurize the interior thereof to prevent a cavitation, said internal pressure being determined by the magnitude of the throttle 33, the string of a spring 37 of a check valve 36 provided on an outlet oil passage 35 of the torque converter T, and the like.

The oil having passed through the check valve 36 is returned to the oil tank R via an oil cooler not shown.

The surplus portion of pressure in discharged from the oil pressure pump P is introduced to a lubricating oil passage 38 from the regulator valve Vr and fed to various lubricating portions. A pressure regulating valve 39 is connected to the lubricating oil passage 38 in order to secure the oil pressure required to the minimum.

When the valve Vm is in a neutral position N as shown, the pressure oil fed to the manual valve Vm is not fed to any of said clutches $C_1$, $C_2$, $C_3$ and various other oil pressure operating portions. When the valve Vm is moved leftwards by one step from the illustrated position and shifted to a drive position D, the operating oil passage 29 from the oil pressure pump P is communicated with an operating oil passage $41_1$ leading to an oil pressure cylinder $40_1$ of the low-speed stage clutch $C_1$ and with an operating oil passage 43 leading to a spring chamber 42 of an oil pressure servo-motor Sm for shifting the selector sleeve 26, and therefore, the low-speed stage clutch $C_1$ is actuated (engaged) to establish the low-speed stage gear train $G_1$. And a piston 44 of the servo-motor Sm remains at a positiom moved leftwards as shown to hold the selector sleeve 26 at the forward position as shown in FIG. 1 through a shift fork 45 thereby placing the backward-movement gear train Gr in an inoperative state.

An inlet oil passage 46 in communication with an input port of a device for generating oil pressure proportional to vehicle speed, that is, a governor valve Vg is branched from the operating oil passage 43 leading to the spring chamber 42 of the servo-motor Sm, and a first signal oil passage $47_1$ extends from an output port of the valve Vg.

The governor valve Vg, which is well known, is rotated about a rotational shaft 49 by a gear 48 meshed with the large-diameter gear 28 of the differential device Df. Thus, the rotational speed is proportion to the vehicle speed, and therefore, the governor valve Vg can release the oil pressure proportional to the vehicle speed, that is, a governor pressure Pg, to the first signal oil passage $47_1$ by the action of the centrifugal force acting on a weight 51 of a spool valve body 50.

An inlet oil passage 53 in communication with an input port of a throttle valve Vt is branched from the operating oil passage 43, and a second signal oil passage $47_2$ extends from an output port of the valve Vt. A modulator valve 54 for determining an upper limit value of the inlet pressure of the throttle valve Vt is disposed halfway of the inlet oil passage 53.

The throttle valve Vt, which is well known, comprises a spool valve body 55, a control spring 58 for biasing the valve body 55 leftwards, a return spring 57 for biasing the valve body 55 rightwards, a control spring 59 for carrying the outer end of the control spring 58, a control cam 60 rotated in association with an increase in opening degree of the throttle valve of the engine E to move the control piston 59 leftwards, an adjusting bolt 61 capable of adjusting the set load of the return spring 57 and the like. When the control piston 59 is moved leftwards, the displacement thereof causes the spool valve body 55 to be pushed leftwards through the control spring 58. With this leftward movement, the oil pressure released to the second signal oil passage $47_2$ acts on a left shoulder 55a of the spool valve body 55 so as to push back the spool valve body 55 rightwards, and therefore, after all, the throttle valve Vt can release the oil pressure proportional to the opening degree of the throttle valve of the engine E, that is, throttle pressure Pt, to the second signal oil passage $47_2$.

The first and second signal oil passages $47_1$, $47_2$ are connected to pilot oil pressure chambers 62, 62'; 63, 63', respectively, on both ends of a low-middle speed shift valve $V_1$ and a middle-high speed shift valve $V_2$. Thereby, spool valve bodies 64, 65 of these shift valves $V_1$, $V_2$ receive at both end surfaces thereof said governor pressure Pg and throttle pressure Pt and are operated as follows:

That is, the spool valve body 64 of the low-middle speed shift valve $V_1$ initially remains at a position moved rightwards as shown by the force of a spring 66 but when the vehicle speed increases to increase the governor pressure Pg and the force for moving the spool valve body 64 leftwards by the governor pressure Pg overcomes the force for moving the valve body 64 rightwards by the throttle pressure Pt and spring 66, a click ball 68 moving together with the valve body 64 in a click motion mechanism 67 provided on the right end of the valve body 64 gets over a fixed locating projection 69 and the valve body 64 is rapidly switched to a leftwardly moved position, whereby the oil pressure from the oil pressure pump P, which has been so far fed only to the oil pressure cylinder $40_1$ of the low-speed stage clutch $C_1$, is also fed to the oil pressure cylinder $40_2$ of the middle-speed stage clutch $C_2$ through operating oil passages 70, 71 and $41_2$ to place both the clutches $C_1$, $C_2$ in an engaged state, thus establishing the middle-speed stage gear train $G_2$.

When the vehicle speed further increases, the similar operation occurs also in the middle-high speed shift valve $V_2$, whereby the spool valve body 65 of the valve $V_2$ is moved leftwards due to the increasing governor pressure Pg to open the operating oil passages $41_2$, 71 to the oil tank R and on the other hand, the operating oil passage 70 is then brought into communication with the operating oil passage $41_3$ leading to the oil pressure chamber $40_3$ of the highspeed stage clutch $C_3$, and therefore, the middle-speed stage clutch $C_2$ assumes the interrupted stated and the low-speed stage clutch $C_1$ and high-speed stage clutch $C_3$ assume the engaged stage to establish the high-speed stage gear train $G_3$ as previously mentioned.

Accumulators 72, 73, a unidirectional valve 74, an orifice control valve 75 and the like are provided to alleviate the gear change shock.

Figure 4:
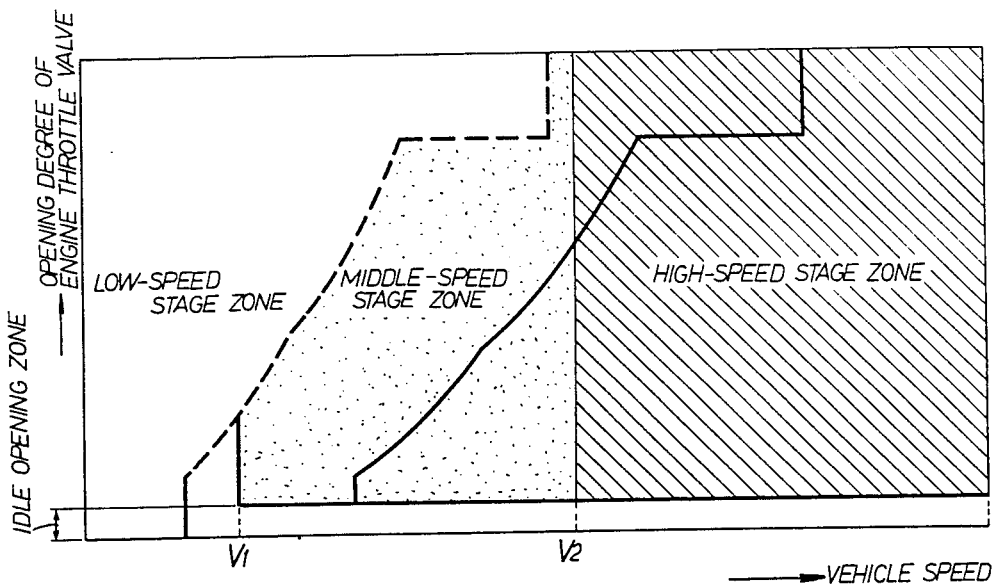

As is well known, a gear change map divided by the solid line can be depicted as shown in FIG. 4. Actually, the change gear map differs between the shift-up time and shift-down time due to the click motion mechanism 67 provided on each of the shift valves $V_1$, $V_2$. This is well known and is not significant. Therefore, only the map for the shift-up time will be given.

When the manual valve Vm is shifted to a position other than the drive position D, for example, to a middle-speed stage retaining position II or backward-movement position Re, the middle-speed stage gear train $G_2$ or backward-movement gear train Gr is established, which has no particularly important relation with the present invention. No further explanation will be made. Among the shift positions of the manual valve Vm, a reference character Pk designates a parking position.

The aforementioned oil pressure circuit is well known.

Now, the control device Dc of the direct coupling clutch Cd will be further explained with reference to FIG. 2. The control device Dc comprises a timing valve Tv and a modulator valve Mv.

The timing valve Tv comprises a spool valve body 80 which is moved between a right first switching position and a left second switching position, a first pilot oil pressure chamber 81 to which a left end surface of the valve body 80 faces, a second pilot oil pressure chamber 81' to which a right end surface of the valve body 80 faces, a first input port 83 which is always communicated with the first pilot oil pressure chamber 81 through a throttle 82 provided on the valve body 80, a second input port 83' which is always communicated with a second pilot oil pressure chamber 81' and an output port 84, wherein when the valve body 80 is in the right first switching position, the first input port 83 is placed in communication with the output port 84 and when the valve body 80 is moved to the left second switching position, the second input port 83+ is placed in communication with the output port 84. An oil passage $41_2'$ branched from the operating oil passage $41_2$ of the middle-speed stage clutch $C_2$ is connected to the first input port 83, and an oil passage $42_3'$ branched from the operating oil passage $41_3$ of the high-speed stage clutch $C_3$ is connected to the second input port 83', the output port 84 being connected to the later-appearing input port 89 of the modulator valve Mv through an output oil passage 85.

The modulator valve Mv comprises a spool valve body 86 which is moved between a right closed position and a left open position, a spring 87 for biasing the valve body 86 towards the open position, a first pilot oil pressure chamber 88 which a left end surface of the valve body 86 faces, a second pilot oil pressure chamber 88' to which a right end surface of the valve body 86 faces, an input and output ports 89, 90, the output port 90 being connected to the oil pressure cylinder 14 of the direct coupling clutch Cd through an output oil passage 91. The first pilot oil pressure chamber 88 is always communicated with the input port 89 through a throttle 92 provided on the valve body 86, a signal oil passage $47_1'$ branched from the first signal oil passage $47_1$ is connected to the second pilot oil pressure chamber 88', and a throttle 93 is provided halfway of the oil passage $47_1'$. A discharge oil passage 95 in communication with the oil tank R is connected to the second pilot oil pressure chamber 88' through a throttle 94, and an electromagnetic valve 96 as a valve device for opening and closing the throttle 94 is provided adjacent the modulator valve Mv. The electromagnetic valve 96 comprises a needle valve 97 for opening and closing the throttle 94, a valve spring 98 for biasing the needle valve 97 toward the closed side and a solenoid 99 for encircling the needle valve 97, the solenoid 99 being connected to a power source 101 through an idle position detecting switch 100. The idle position detecting switch 100 is interlocked with an accelerator pedal 102 for opening and closing the throttle valve of the engine E and the switch 100 is closed when the throttle valve is returned to the idle opening zone. The throttle 94 of the discharge oil passage 95 is set to an opening degree smaller than the throttle 93 of the signal oil passage $47_1'$.

The operation of the control device Dc will be explained hereinafter.

First, where the vehicle is running with the establishment of the low-speed stage gear train $G_1$, in this case, the low-speed stage clutch $C_1$ is operating, and therefore, the operating oil passages $41_2$, $41_3$ of the middle and high-speed stage clutches $C_2$, $C_3$ are communicated with the oil tank R and thus the first and second input ports 83, 83' and output port 84 of the timing valve Tv and the first pilot oil pressure chamber 88 of the modulator valve Mv are also communicated with the oil tank R, and the valve body 86 of the modulator valve Mv is held in the open position as shown by the spring force of the spring 87 and the pressing force resulting from the governor pressure Pg introduced into the second pilot oil pressure chamber 88' through the signal oil passage $47_1'$ and therefore, the interior of the oil pressure chamber 14 of the direct coupling clutch Cd has atmospheric pressure.

On the other hand, since a part of the line pressure Pl is introudced into the torque converter through the throttle 33, the piston 13 of the direct coupling clutch Cd is moved leftwards by the internal pressure of the torque converter T to place the clutch Cd in a released state.

When the vehicle speed increases from said condition and the middle-speed stage clutch $C_2$ is actuated by being supplied with the operating oil pressure from the operating oil passage $41_2$, said oil pressure is simultaneously introduced into the first pilot oil pressure chamber 81 of the timing valve Tv via the oil passage $41_2'$ and the first input port 83. The valve body 80 is shifted to the right first switching position by said introduced oil pressure, and therefore, the oil pressure of the first input port 83 passes through the output port 84, then passes through the input and output ports 89, 90 of the modulator valve Mv in the open position from the output oil passage 85 and then is introduced into the oil pressure cylinder 14 of the direct coupling clutch Cd via the output oil passage 91.

At the same time, in the modulator valve Mv, the oil pressure of the input port 89 acts even on the first pilot oil pressure chamber 88 through the throttle 92, and said oil pressure imparts the rightwardly moving force to the valve body 86. When said rightwardly moving force overcomes the leftwardly moving force of the spring 87 and the governor pressure Pg introduced into the second pilot oil pressure chamber 88' with respect to the valve body 86, the valve body 86 is moved rightwards so as to close the output port 90. When the relation of these forces is reversed, the valve body 86 is operated so as to open the output port 90. As a consequence, the output oil pressure of the output port 90, that is, the operating oil pressure of the direct coupling clutch Cd is controlled from the governor pressure Pg proportional to the vehicle speed to the modulator pressure Pm (see FIG. 3) increased to a given level, said level of increment being determined by the set load of the spring 87.

Accordingly, in FIG. 3, since the modulator pressure Pm is lower than the internal pressure of the torque converter T at a level below the vehicle speed $v_1$, the direct coupling cluth Cd cannot be operated (engaged) even if the modulator pressure Pm is introduced into the oil pressure cylinder 14, thus not imparing the torque amplifying function of the torque converter T. It can be understood from the above-described fact that for example, in FIG. 2, even if the manual valve Vm is set to the backward-movement position Re or the middle-speed stage retaining position II and the middle-speed stage clutch $C_2$ is initially in the operating (engaging) condition, the torque converter T is operated as usual to render possible to start the vehicle.

Figure 3:
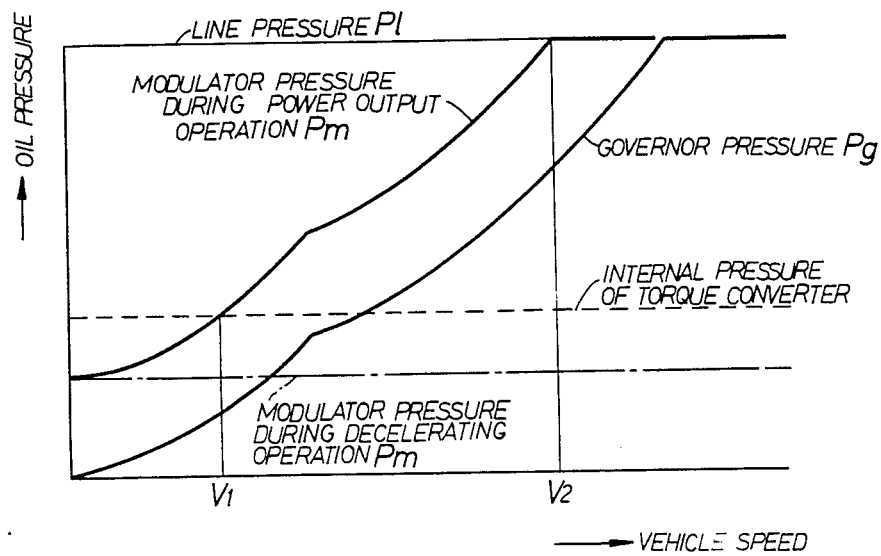

Also, in FIG. 3, when the vehicle speed V is in the zone of $v_1 \leq v \leq v_2$, the modulator pressure Pm increases as the vehicle speed increases to gradually strengthen the engaging force of the direct coupling clutch Cd to thereby obtain the weak engaging zone of the direct coupling clutch Cd as shown by the sand-like ground in FIG. 4. Thus, when in this zone, the output torque of the engine E increases beyond the engaging force of the direct coupling clutch Cd, the direct coupling cluch Cd slips and the torque of a part corresponding to the engaging force of the direct coupling clutch Cd is subject to torque amplification via a mechanical transmission system including the clutch Cd and the torque of a part above the engaging force of the direct coupling clutch Cd is subject to torque amplification via a fluid transmission system including a fluid within the torque converter T. Therefore, after all, under the fixed vehicle speed, the power divisional driving of a variable rate wherein the torque bearing rate of the fluid transmission system increases as the output torque of the engine increases is effected.

When the vehicle speed V enters the high-speed zone of $v > v_2$, the governor pressure Pg introduced into the second pilot oil pressure chamber 88' of the modulator valve Mv increases enough to fully open the valve body 86, and therefore, the modulator pressure Pm is increased up to the operating oil pressure of the middle-speed stage clutch $C_2$, that is, to the line pressure Pl to augment the engaging force of the direct coupling clutch Cd to the maximum whereby the strong engaging zone of the direct coupling clutch Cd shown by the oblique lines in FIG. 4 is obtained. Thus, in this zone, the direct coupling clutch Cd will not slip and all the output torque of the engine E can be transmitted efficiently.

When the vehicle speed increases from said state, the operating oil pressure of the middle-speed stage clutch $C_2$ is released to the oil tank R and the high-speed stage clutch $C_3$ in place of the clutch $C_2$ receives the operating oil pressure from the operating oil passage $41_3$ for operation, that is, when the shft-up is made, said oil pressure is simultaneously introduced into the second pilot oil pressure chamber 81' of the timing valve Tv via the oil passage $41_3'$ and second input port 83', and the valve body 80 is shifted to the left second switching position by said introduced oil pressure. However, the switching operation of the valve body 80 is slowly controlled by the delayed action of the throttle 82 to impart the valve body 80 a given switching time. Since the operating oil pressure of the direct coupling clutch Cd is once released through the oil passage $41_2'$ already communicated with the oil tank R during that period, the operation of the direct coupling clutch Cd is temporarily released to prevent occurrence of change gear shock.

When the valve body 80 of the timing valve Tv is shifted to the left first switching position, the oil pressure of the second input port 83' is then supplied to the oil pressure cylinder 14 of the direct coupling clutch Cd through the modulator valve Mv similar to the time when the middle-speed stage gear train $G_2$ is established as previously described, and the oil pressure is also controlled by the modulator valve Mv in a manner similar to that as previously described. Such an operation is likewise carried out even at the time of downshift wherein the operation is switched from the high-speed stage gear train $G_3$ to the middle-speed stage gear train $G_2$.

Next, when the operating force is released from the accelerator pedal 102 to decelerate the vehicle, the idle position detecting switch 100 is closed to excite the solenoid 99 to open the needle valve 97, and therefore, the pressure oil within the second pilot oil pressure chamber 88' of the modulator valve Mv flows into the discharge oil passage 95 through the throttle 94. On the other hand, the oil pressure is supplied to the second pilot oil pressure chamber 88' through the throttle 93 from the signal oil passage $47_1'$. However, the quantity of oil discharged to the discharge oil passage 95 is greater than the quantity of oil supplied to the second pilot oil pressure chamber 88' due to the difference in size between both the throttles 93 and 94 as previously described, and after all, the pressure of the second pilot oil pressure 88' assumes substantially atmospheric pressure. Thus, the modulator valve Mv releases the low modulator pressure Pm as indicated by the phantom outlines in FIG. 3, and since the pressure at this time is lower than the internal pressure of the torque converter T as indicated by the dotted lines, the direct coupling clutch Cd causes the piston 13 to be withdrawn and is placed in a released state. For this reason, the idle zone of the opening degree of the throttle valve is shown in white in FIG. 4. In this manner, the reverse load generated with the deceleration driving of the vehicle is transmitted hydrodynamically to the engine E through the torque converter T without depending on the idle operation of the roller 15 of the direct coupling clutch Cd and therefore, the noises and vibrations are alleviated.

Figure 5:
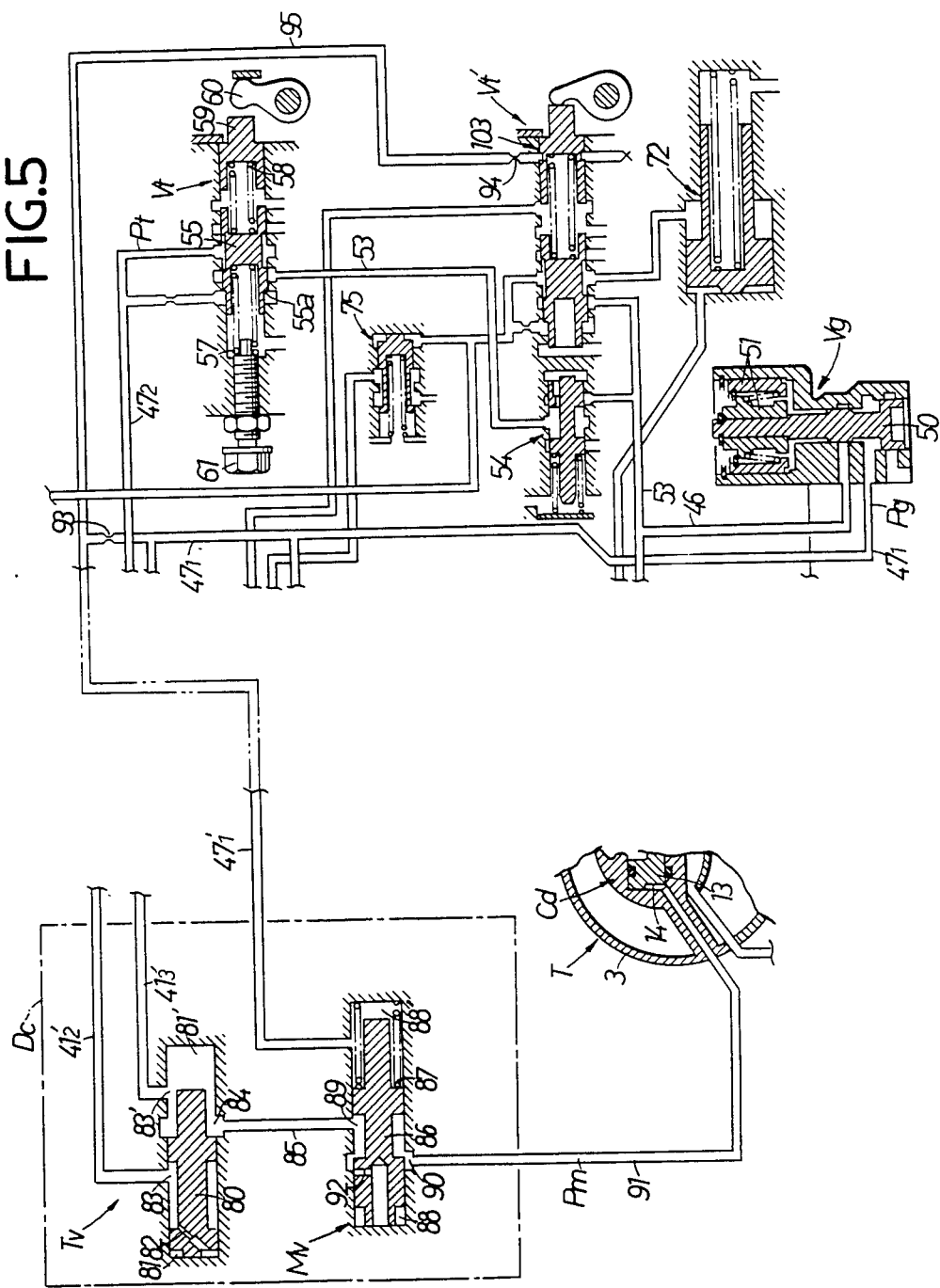
FIG. 5 is an oil pressure circuit view showing a second embodiment of the present invention.

FIG. 5 shows a second embodiment of the present invention. In this embodiment, a throttle valve Vt or Vt' interlocked with the accelerator pedal 102 is utilized as a means for releasing oil pressure from the second pilot oil pressure chamber 88' of the modulator valve Mv in the idle zone of the opening degree of the throttle valve. That is, an opening and closing valve 103 as a valve device which is opened when the throttle valve Vt or Vt' is returned to the illustrated idle position is provided on the throttle valve, and said opening and closing valve 103 is incorporated in the discharge oil passage 95 branched from the signal oil passage $47_1'$ associated with the second pilot oil pressure chamber 88' of the modulator valve Mv. A throttle 93 is provided on the signal oil passage $47_1'$ at an upstream from the branched portion of the discharge oil passage 95 and a throttle 94 larger in opening degree than that of the throttle 93 is provided on the oil passage 95. Other constructions are the same as those shown in the previous embodiment. In FIG. 5, parts having the same function as that of the previous embodiment are given the same reference characters. It is noted that the throttle 94 of the discharge oil passage 95 can be omitted.

In this manner, when the throttle valve Vt or Vt' is returned to the idle position, the opening and closing valve 103 is opened, and therefore, the oil pressure of the second piot oil pressure chamber 88' of the modulator valve Mv is discharged to the discharge oil passage 85. Thus, the output oil pressure of the modulator valve Mv lowers similarly to the previous embodiment and the direct coupling clutch Cd assumes a released state.

As described above, in accordance with the present invention, a single modulator valve can performs two modes of lock-up control, one wherein the engaging force of the direct coupling clutch is controlled in accordance with the variation in vehicle speed, and the other wherein the direct coupling clutch is released under the idle condition of the engine throttle valve. As a consequence, the present invention has effects in that the device can be materially simplified and that a loss of leakage of pressure oil from the valve can be minimized.

Figure 6:
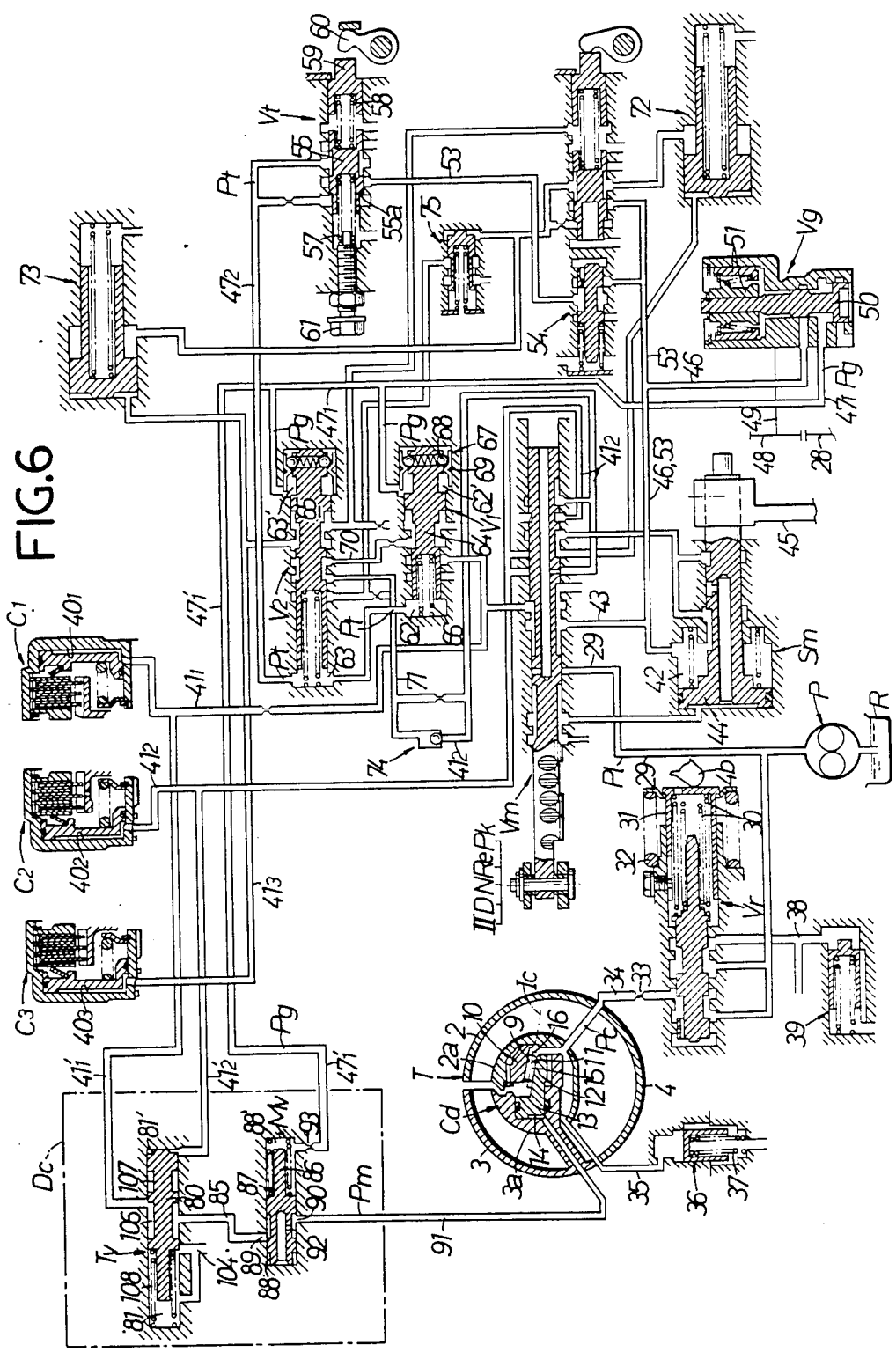
FIG. 6 is an oil pressure circuit view showing a third embodiment of the present invention.

FIG. 6 shows a third embodiment of the present invention. This embodiment is different from the previous embodiment in a timing valve Tv in the lock-up control device Dc. That is, the timing valve Tv comprises a spool valve body 80 which is moved between a right first switching position and a left second swtiching position, a first pilot oil pressure chamber 81 to which a left end surface of the valve body 80 faces, a second pilot oil pressure chamber 81' to which a right aend surface of the valve body 80 faces, and a spring 108 for biasing the valve body 80 rightwards, wherein an oil passage $41_2'$ branched from an operating oil passage $41_2$ of a middle-speed stage clutch $C_2$ is connected to the second pilot oil pressure chamber 81', the first pilot oil pressure chamber 81 being communicated with an oil tank R through an oil passage 104. The valve body 80 is provided in a circumferential surface thereof with two annular grooves 106, 107. When the valve body 80 is in the first switching position as shown, the input oil passage $41_1'$ branched from the operating oil passage $41_1$ of the low-speed stage clutch $C_1$ and led to the timing valve Tv is communicated with an output oil passage 85 of the timing valve Tv through the annular groove 106, and when the valve body 80 is moved leftwards to assume the second switching position, the oil passage $4_1'$ is communicated with the oil passage 85 through the annular groove 107. In the position halfway wherein the valve body 80 is moved between the first switching position and the second switching position, the output oil passage 85 is temporarily shut off from the input oil passage $41_1'$ and is communicated with the oil tank R. Other constructions are the same as those shown in the previous embodiment. In FIG. 6, parts having the same function as that of the previous embodiment are given the same reference characters.

Figure 7:
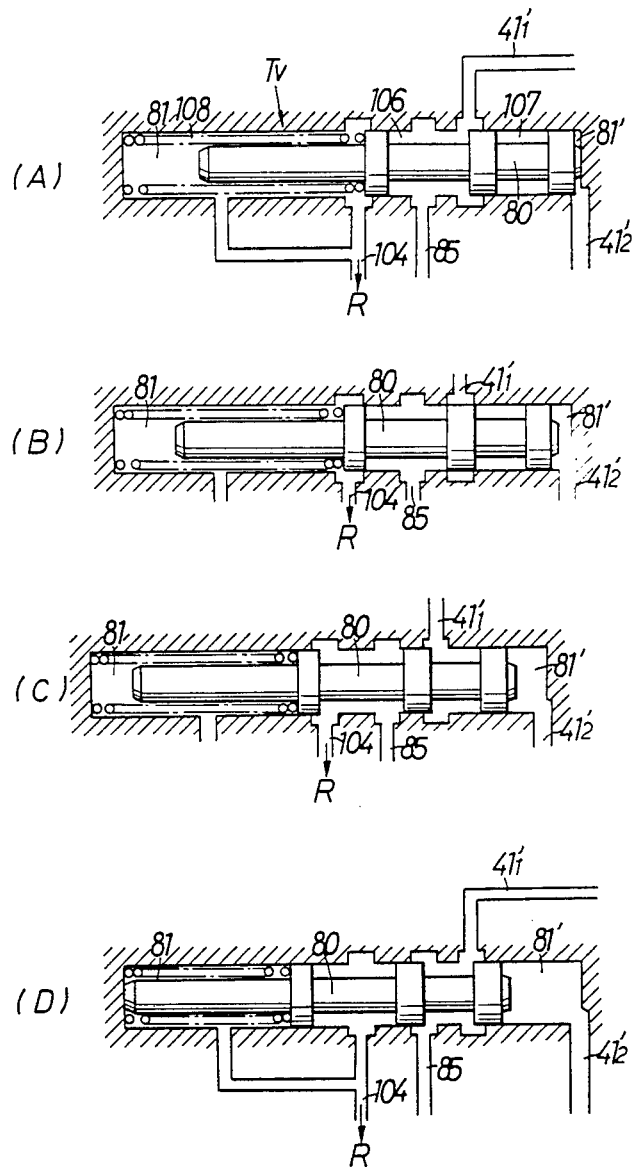
FIGS. 7 A-D are explanatory views showing the operation of a timing valve in FIG. 6 in order.

In this embodiment, when the vehicle speed increases and the shift valve $V_1$ is switched due to the difference between the governor pressure Pg and the throttle pressure Pt and the operating oil pressure is supplied from the operating oil passage $41_2$ in order to establish the middle-speed stage gear train $G_2$ so that the middle-speed stage clutch $C_2$ is actuated, said oil pressure is simulataneously introduced into the second pilot oil pressure chamber 81' of the timing valve Tv through the oil passage $41_2'$, by which introduced oil pressure, the valve body 80 is shifted to the left second switching position. The operating conditions of the timing valve Tv during that period are shown in FIGS. 7 A-D.

First, FIG. 7A shows the state similar to FIG. 6 in which the oil pressure is not applied to the second pilot oil pressure chamber 81'. In this case, the oil passage $41_1'$ is communicated with the oil passage 85 through the annular groove 106. When the vehicle speed increases and the pressure of the oil passage $41_2$ is increased by the switching operation of the shift valve $V_1$ or $V_2$, the pressure within the second pilot oil pressure chamber 81' is increased through the oil passage $41_2'$. When this pressure becomes greater than the set load of a spring 108, the valve body 80 begins to be moved leftwards and the oil passage $41_1$ is closed as shown in FIG. 7B. The oil passage 85 also remains closed, and the modulator pressure Pm is maintained constant. When the pressure within the second pilot oil pressure chamber 81' further increases, the valve body 80 is further moved leftwards and the oil passage 85 is communicated with the oil passage 104 as shown in FIG. 7C whereby the pressure oil within the oil passage 85 is circulated to the oil tank R. Thus, the modulator pressure Pm lowers and the piston 13 of the direct coupling clutch Cd is moved leftwards to releast the lock-up. When the pressure within the second pilot oil pressure chamber 81' further increases and the valve body 80 is further moved leftwards, the output oil passage 85 is shut off from the oil passage 104 as shown in FIG. 7D and connected to the input oil passage $41_1'$ through the annular groove 107. Thus, the oil pressure of the input oil passage $41_1'$ passes through the output oil passage 85, thence passes through the input and output ports 89, 90 of the modulator valve Mv in the open position, and is again introduced into the oil pressure cylinder 14 of the direct coupling clutch Cd.

FIG. 8 represents the variation of the modulator pressure Pm, that is, the engaging force of the direct copling clutch Cd, with the time t given by the abscissa. As will be apparent from FIG. 8, during the variation of the oil pressure transmitted through the oil passage $41_2'$, that is, during the change gear operation, the modulator pressure Pm is lower than the internal pressure Pc of the torque converter T and the operation of the direct coupling clutch Cd is temporarily released.

When the vehicle speed increases and the middle-high speed shift valve $V_2$ is actuated and the high-speed stage clutch $C_3$ receives the operating oil from the operating oil passage $41_3$ for operation, that is, when the shift-up is effected, the operating oil pressure of the middle-speed stage clutch $C_2$ is simultaneously released to the oil tank R and therefore, the oil pressure within the second pilot oil pressure chamber 81' of the timing valve Tv is also released to the oil tank R through the oil passage $41_2'$. Thus, the valve body 80 is moved rightwards by the biasing force of the spring 108. At this time, the timing valve Tv is operated in order of the mode of FIGS. 7C, 7B and 7A from the mode of FIG. 7D. Thus, even at the change gear time, the modulator pressure Pm is temporarily lowered to release the operation of the direct coupling clutch Cd.

The above-described operation is likewise carried out at the time of shift-down, wherein the high-speed stage gear train $G_3$ is shifted to the middle-speed stage gear train $G_2$ and the middle-speed stage gear train $G_2$ is shifted to the low-speed stage gear train $G_1$. In either case, connection and interruption of the middle-speed stage clutch $C_2$ are detected whereby the timing valve Tv is operated and the direct coupling clutch Cd is temporarily released.

According to this embodiment, in the timing valve Tv, only the modulator pressure Pm is lowered without connecting the operating oil pressure of the low-speed stage clutch $C_1$ with the oil passage 104 in communication with the oil tank R, to release the engagement of the direct coupling clutch Cd. Therefore, it is not feared that the operating oil pressure of the low-speed stage clutch $C_1$ is excessively lowered with the result that the clutch $C_1$ slips to shorten the service life.

Figure 9:
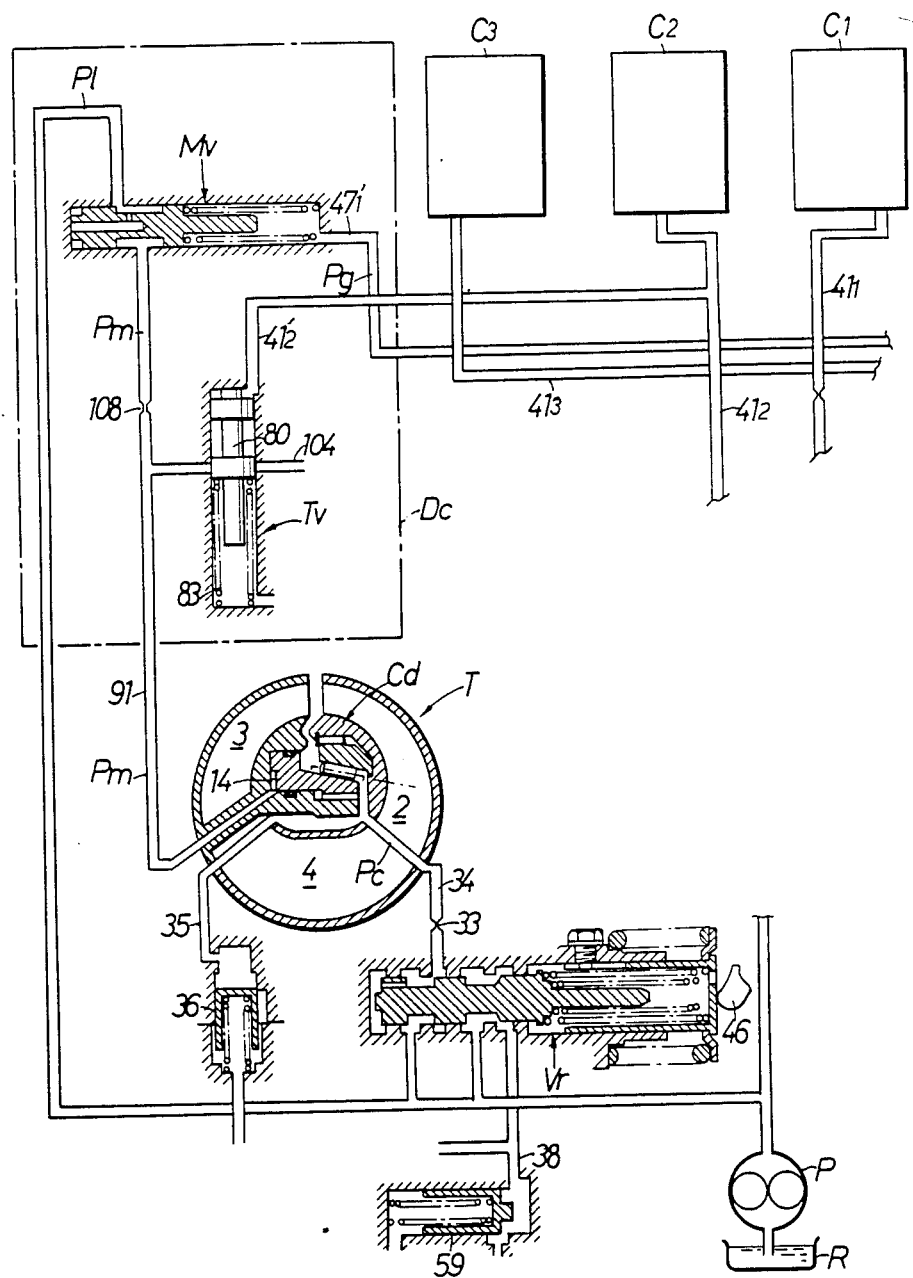
FIG. 9 is an oil pressure circuit view showing a fourth embodiment of the present invention.

FIG. 9 shows a fourth embodiment of the present invention. This embodiment is different from that of FIG. 6 in the control device Dc and in a source of the operating oil pressure of the direct coupling clutch Cd, the source being the discharge side of the oil pressure pump P, that is, the line pressure Pl. However, the operation therefor is almost the same and therefore, parts in FIG. 9 corresponding to those of FIG. 6 are given the same reference characters.

The control device Dc has a modulator valve Mv for generating a variable modulator pressure Pm by the governor pressure Pg guided through the oil passage $47_1'$, similar to the embodiment of FIG. 6, and the timing valve Tv is connected at the downstream side of the modulator valve Mv. An oil passage 104 branched from an output oil passage 91 of the modulator valve Mv and connected to the oil tank R is opened and closed by the timing valve Tv. The valve body 80 of the timing valve Tv is moved from the first switching position to the lower second switching position as shown by the operating oil pressure of the middle-speed stage clutch $C_2$. The valve body 80 closes the oil passage 104 at the first switching position and second switching position. That is, when the operating oil pressure of the middle-speed stage clutch $C_2$ is the maximum and zero, namely, atmospheric pressure, the oil passage 104 is closed to transmit the output oil pressure of the modulator valve Mv to the direct coupling clutch Cd. However, in the halfway or transit stage, the oil passage 104 is opened to connect the oil pressure cylinder 14 of the direct coupling clutch Cd with the oil tank R to release the operation thereof. A throttle 108 is provided at an upstream from the branched point of the oil passage 104 in order to sufficiently reduce the pressure within the oil pressure cylinder 14.

In this embodiment, even when the manual valve Vm is shifted to the middle-speed stage retaining position II, the oil passage 46 (see FIG. 6) is pressurized to generate the governor pressure Pg, and therefore, the direct coupling clutch Cd can be actuated.

Figure 10:
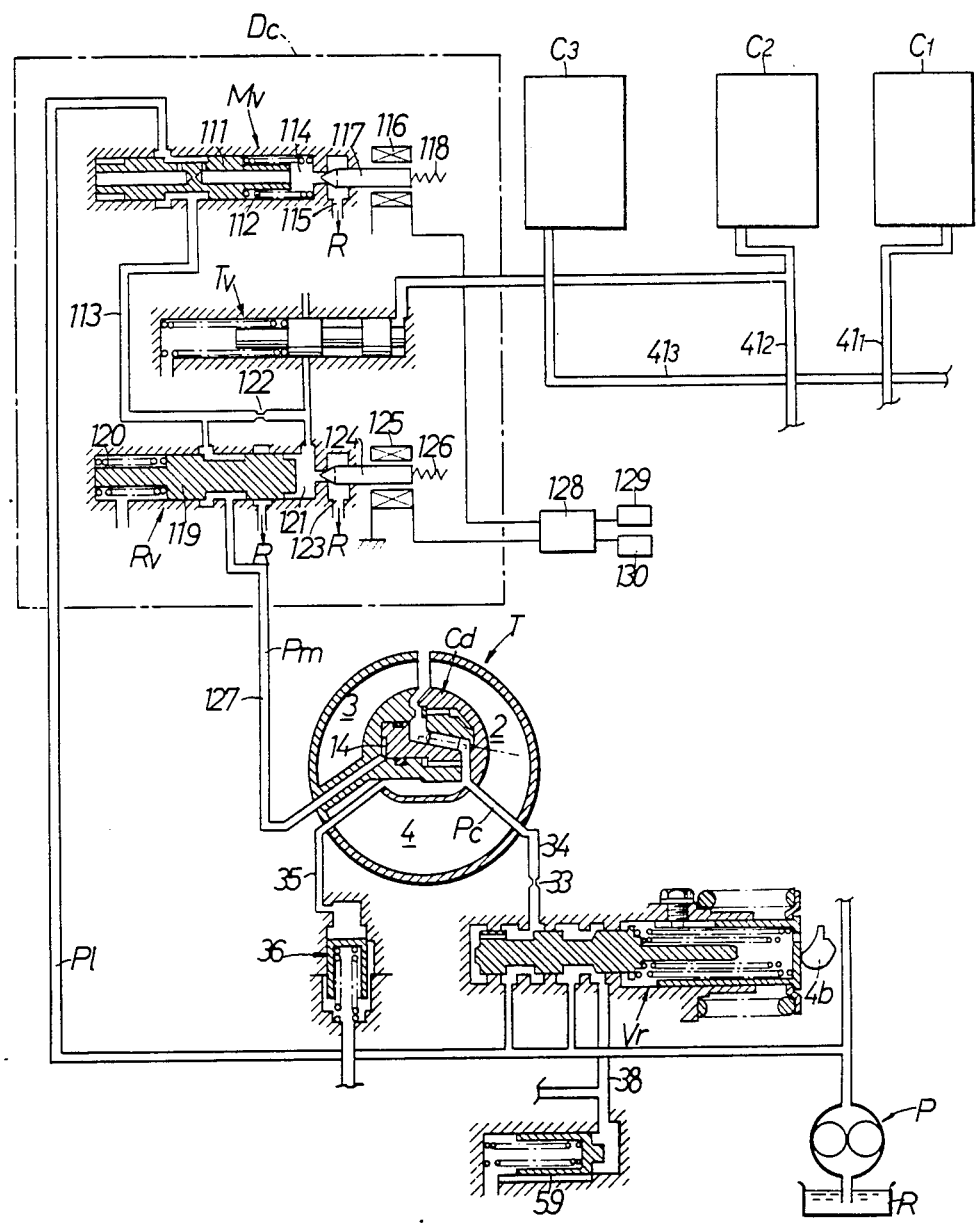
FIG. 10 is an oil pressure circuit view showing a fifth embodiment of the present invention.

FIG. 10 shows a fifth embodiment of the present invention. Also in this embodiment, the line pressure Pl is used as an oil pressure source similarly to the embodiment of FIG. 9.

A spool valve body 111 of the modulator valve Mv is biased towards the open side as shown by means of a spring 112 and biased toward the right open side by the oil pressure of the output oil passage 113. A part of the output oil pressure is guided also to the oil pressure chamber 114. This oil pressure chamber 114 is connected to the oil tank R through the oil passage 115 which is in turn opened and closed by a pilot vlave 107 driven by a solenoid 116. The pilot valve 117 is always biased by a spring 118 and normally closes the oil passage 115. However, when the solenoid 116 is excited, the oil passage 115 is opened to release the oil pressure chamber 114 to the oil tank R. Thus, when the solenoid 116 is deenergized, the oil pressure applied to the valve body 111 of the modulator valve Mv is equal to each other on both sides thereof and the valve body 111 remains positioned as shown by the force of the spring 112. Therefore, the line pressure Pl is released to the oil passage 113 but when the solenoid 116 is excited, the valve body 111 is moved rightwards and a fixed pressure lower than the line pressure Pl determined by the strength of the spring 112 is released to the oil passage 113.

A lock-up release valve Rv is connected to the output oil passage 113 of the modulator valve Mv. A spool valve body 119 of the lock-up release valve Rv is biased rightwards by a spring 120. The oil pressure of the oil passage 113 is guided through a throttle 122 to an oil pressure chamber 121 on the right side of the lick-up release valve Rv. This oil pressure chamber 121 is connected to the oil tank R through an oil passage 123 which is in turn opened and closed by a pilot valve 124. The pilot valve 124 is driven by a solenoid 125, and when the solenoid 125 is deenergized, the oil passage 123 is closed by a spring 126 but when the solenoid 125 is excited, the oil passage 123 is opened. Thus, when the solenoid 125 is deenergized, the valve body 119 assumes a position shown leftwardly by the pressure oil supplied to the oil pressure chamber 121 through the throttle 122 to connect the oil passage 113 to the output passage 127 to guide the oil pressure of the oil passage 123 to the oil pressure cylinder 14 of the direct coupling clutch Cd. When the solenoid 125 is excited, the oil pressure chamber 121 is open to the oil tank R, and the valve body 119 is moved rightwards by the force of the spring 120 to place the oil passage 127 in communication with the oil tank R to release the operation of the direct coupling clutch Cd.

These two solenoids 116 and 125 are excited or deenergized by an electronic circuit 128. This electronic circuit 128 control the solenoids 116, 125 in response to signals from a vehicle speed detector 129 and an engine load detector 130. For example, the solenoid 116 is turned On when the vehicle speed is for example below 60 Km/h and turned ON when it is above 60 Km/h. The solenoid 125 is turned ON when the engine is in the idle condition and turned OFF when the engine is in the other conditions, or said solenoid is turned ON when the vehicle speed is for example below 20 Km/h and turned OFF when the vehicle speed is above 20 Km/h. In this manner, until the vehicle speed reaches 20 Km/h after the vehicle started, the direct coupling clutch Cd is released by the function of the solenoid 125 and the function of the torque converter T can be utilized. At the vehicle speed lower than 60 Km/h, even if the direct coupling clutch Cd is actuated, the engaging force thereof is weak. When the throttle pedal is trod, a relative motion occurs between the pump vane wheel 2 of the torque converter T and the turbine vane wheel 3 even during the operation of the direct coupling clutch Cd. There assumes the power divisional operation wherein a part of power is transmitted even through the torque converter T.

The pressure oil within the pilot oil pressure chamber 121 of the release valve Rv is discharged to the oil tank R by the excitement of the solenoid 125 as described above and at the same time, a part of the oil pressure is discharged at a certain time during the change gear operation even by the timing valve Tv provided parallel to the release valve Rv. The construction and operation of the timing valve Tv are the same as those shown in FIG. 9 and therefore the explanation thereof will be omitted. If the pressure oil within the pilot oil pressure chamber 121 is discharged, the operation of the direct coupling clutch Cd is released and therefore the intended object can be achieved.

In accordance with this embodiment, since the direct coupling clutch Cd of the torque converter T can be actuated irrespective of the shift position of the manual valve Vm, the torque converter T can be locked up in three ranges, namely, the drive position D, middle-speed retaining position II and backward-movement position Re.

Futhermore, in accordance with this embodiment, the timing valve Tv is used as the pilot valve, and the operating oil is circulated by the release valve Rv from the oil pressure cylinder 14 of the direct coupling clutch Cd to the oil tank R. Therefore, despite the fact that the timing valve Tv itself is simple as in the embodiment shown in FIG. 9, the engagement and release of the direct coupling clutch Cd can be carried out more accurately.

As described above, in the present invention, the direct coupling clutch is actuated by the signal pressure increased or reduced by the selection of either gear train and the oil pressure source for generating oil pressure in common even if either gear train is selected, and when the signal pressure varies, the operation of the direct coupling clutch is released. For example, if an arrangement is made so as to detect and control the operating oil pressure of the middle-speed stage clutch, the release of coupling and re-coupling of the direct coupling clutch can be effected efficiently at the time of two change gear modes, that is, the low-speed stage to middle-speed stage and the middle-speed stage to high-speed stage. A single timing valve or the like used will suffice, and therefore, the construction of the device is simple and the reliance is high. In addition, since the locking-up of the torque converter over three adjacent speed ratios may be achieved, fuel cost can be materially improved. Even in the automatic transmission with four stages of forward, if the locking-up is made with three stages, the second, third and top, the fuel cost equal to that of the gear transmission can be expected.

FIG. 12 shows a sixth embodiment of the present invention. This embodiment is different from the previous embodiment in the control device Dc. This control device Dc comprises a timing valve Tv, a modulator valve Mv and an ON/OFF valve Vo which are hydraulically connected in series. Here, the order of connection of these valves is not limited to the illustrated order but other orders may be employed.

The timing valve Tv is provided to temporarily release the lock-up condition of the direct coupling clutch Cd at the time of change gear and comprises a spool valve body 285 which is moved between a right first switching position and a left second switching position, a pilot oil pressure chamber 286 to which a left end surface of the valve body 285 faces, a second pilot oil pressure chamber 287 to which a right end surface of the valve body 285 faces, and a spring 288 for biasing the valve body 285 rightwards, wherein an oil passage $41_2'$ branched from the operating oil passage $41_2$ of the middle-speed stage clutch $C_2$ is connected to the second pilot oil pressure chamber 287, and the first pilot oil pressure chamber 286 is communicated with the oil tank R through an oil passage 290. The valve body 285 is provided in the outer circumference thereof with two symmetrical left and right annular grooves 292, 293 with a land 291 sandwiched therebetween. When the valve body 285 is in the first switching position as shown, the oil passage $41_1'$ branched from the operating oil passage $41_1$ to the low-speed stage clutch $C_1$ is communicated with an output oil passage 294 to the modulator valve Mv. This condition remains unchanged even when the valve body 285 is in the left second switching position but in the position halfway wherein the valve body 285 is moved between the first switching position and the second switching position, the output oil passage 294 is temporarily shut off from the oil passage $41_1'$ and is communicated with only the oil passage 283 branched from the lubricating oil passage 38.

For example, in the event that the valve body 285 is moved from the first switching position to the second switching position as shown, the oil passage 41' is first closed by the land 291, the oil passage 283 is then communicated with the output oil passage 294 and the output oil passage 294 is closed passing through the land 291. Then, the output oil passage 294 is again communicated with the oil passage $41_1'$. Conversely, in the event that the valve body 285 is moved rightwards from the second switching position to the first switching position, the land 291 first closes the output oil passage 294, the output oil passage 284 is then communicated with the oil passage 283, the oil passage 283 is closed and finally the output oil passage 294 is communicated with the oil passage $41_1'$.

When the valve body 285 is in the position as shown, the oil passage 285 is communicated with the oil tank R through the first pilot oil pressure chamber 286 but the valve body 285 is moved leftwards during the engagement of the middle-speed stage clutch $C_2$ and communicated with the oil passage 283 but shut off from the oil tank R.

The modulator valve Mv is provided to form the lock-up engaging force with the governor pressure Pg serving as a base and comprises a spool valve body 296 which is moved between a right closed postion and a left open position, a spring 297 for biasing the valve body 296 towards the open position, a first pilot oil pressure chamber 298 to which a left end surface of the valve body 296 faces, a second pilot oil pressure chamber 299 to which a right end surface of the valve body 296 faces, an input port 300 and an output port 301. The input 300 is connected to the output oil passage 294 of the timing valve Tv, and the output port 301 is connected to the oil passage 302. The first pilot oil pressure chamber 298 is always commuciated with the output port 301 through a throttle 103 provided on the valve body 296.

The second pilot oil pressure chamber 299 is connected through a high-select valve Vs to the oil passage 295 and to the oil passage $47_1'$ branched from the first signal oil passage $47_1$ which guides the governor pressure Pg. The high-select valve Vs is constructed such that a spherical valve body 326 is housed within a casing 325 which concentrically connects the oil passage 295 and oil passage $47_1'$. The high-select valve Vs compares the oil pressure of the oil passage 295, namely, the lubricating oil pressure Pu or zero (atmospheric pressure) with the oil pressure of the oil passage $47_1'$, namely, the governor pressure Pg, and the higher pressure among them is introduced into the second pilot oil pressure chamber 299 of the modulator valve Mv.

The ON/OFF valve Vo is provided to release the lock-up of the direct coupling clutch Cd when the opening degree of throttle is in the idle position and comprises a spool valve body 305 which is moved between a right closed position, that is, a lock-up release position and a left open position, a spring 306 for biasing the valve body 305 towards the closed side, a first pilot oil pressure chamber 307 to which a left end surface of the valve body 305 faces, and a second pilot oil pressure chamber 308 to which a right end surface of the valve body 305 faces. The input port is communicated with the oil passage 302 from the modulator valve Mv, and the output port is communicated with the interior of the oil pressure cylinder of the direct coupling clutch Cd through an output oil passage 309. The second pilot oil pressure chamber 308 is connected to an oil passage 310 branched from the oil passage 282 which guides oil pressure proportional to the opening degree of the throttle of the engine E to back-pressure chambers of the accumulators 72 and 73 from the valve Vt', and the first pilot oil pressure chamber 307 is connected to the oil tank R.

The ON/OFF valve Vo is opened when the output of the valve Vt', that is, the oil pressure proportional to the opening degree of the throttle of the engine E overcomes the spring force of the spring 306 to guide the output of the modulator valve Mv to the oil pressure cylinder 14 of the direct coupling clutch Cd. When the output of the valve Vt' is smaller than the spring force of the spring 306, the valve opens to bring the oil passage 309 into communication with a release port 311, and the oil pressure within the oil pressure cylinder 14 is released to the oil tank R.

While the oil pressure from the valve Vt' provided to alleviate the shock at the time of change gear is exerted on the second pilot oil pressure chamber 308, it is noted that in principle, the throttle pressure Pt from the throttle valve Vt can be exerted thereon.

Next, the operation of this embodiment will be explained. The lock-up control of the direct coupling cluch Cd is effected only when the manual valve Vm is in the drive position D and therefore, only this case will be explained.

First, when the vehicle is started with the manual valve Vm shifted to the drive position D, the oil pressure is not exerted on the oil passage $41_2'$ because the change gear ratio is initially in the low-speed stage, and thus the timing valve Tv is in the first switching position shown in FIG. 12. The oil pressure of the oil passage 295 is zero, and the governor pressure Pg from the oil passage $47_1'$ is exerted on the second pilot oil pressure chamber 299 of the modulator valve Mv from the high-select valve Vs.

At that time, in the modulator valve Mv, the oil pressure of the output port 301 is exerted on the first pilot oil pressure chamber 298 through the throttle 303, and said oil pressure imparts the rightwardly moving force to the valve body 296. When this rightwardly moving force overcomes the leftwardly moving force for the valve body 296 resulting from the spring 297 and the governor pressure Pg introduced into the second pilot oil pressure chamber 299, the valve body 296 is moved rightwards so as to close the input port 300. When the relation of the forces therebetween is reversed, the valve body 296 is operated so as to open the input port 300. As a consequence, the output oil pressure of the output port 301, that is, the operating oil pressure of the direct coupling clutch Cd is increased to a fixed level from the governor pressure Pg proportional to the vehicle and is as shown by the curve $\alpha$ in FIG. 13. When the operating oil pressure reaches the vehicle speed A above the internal pressure Pc of the torque converter T, the piston 13 of the direct coupling clutch Cd is moved rightwards at a speed above said vehicle speed, the direct coupling clutch Cd is engaged and the torque converter T is locked up.

Figure 13:
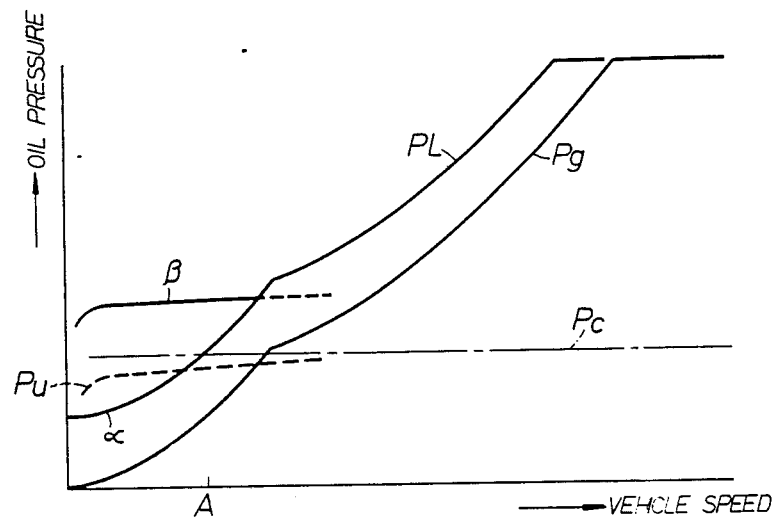
FIG. 13 is a curve showing the engaging pressure of the direct coupling clutch in FIG. 12.

When the vehicle speed further increases to establish the change gear ratio of the middle-speed stage, the timing valve Tv is moved leftwards to assume the second switching position and the oil passage 295 is communicated with the oil passage 283. Therefore, the oil pressure guided from the high-select valve Vs to the second pilot oil pressure chamber 299 of the modulator valve Mv is a higher one among the governor pressure Pg or lubricating oil pressure Pu, and the oil pressure resulting from the increase in such higher oil pressure is the output oil pressure of the modulaor valve Mv, that is, the operating oil pressure of the direct coupling clutch Cd. The magnitude of the lubricating oil pressure Pu can be selected as shown in FIG. 13 to thereby make the aforesaid operating oil pressure higher than the internal pressure Pc of the torque converter T as shown in the curve $\beta$, and the direct coupling cluch Cd can be locked up at a speed lower than the vehicle speed A, In FIG. 13, a slightly right and upward indication of the lubricating oil pressure Pu results from the phenomenon wherein the quantity of surplus oil increases with the increase in vehicle speed, that is, with the increase in the number of revolutions of the engine E, but it can be considered to be approximately horizontal.

Figure 14:
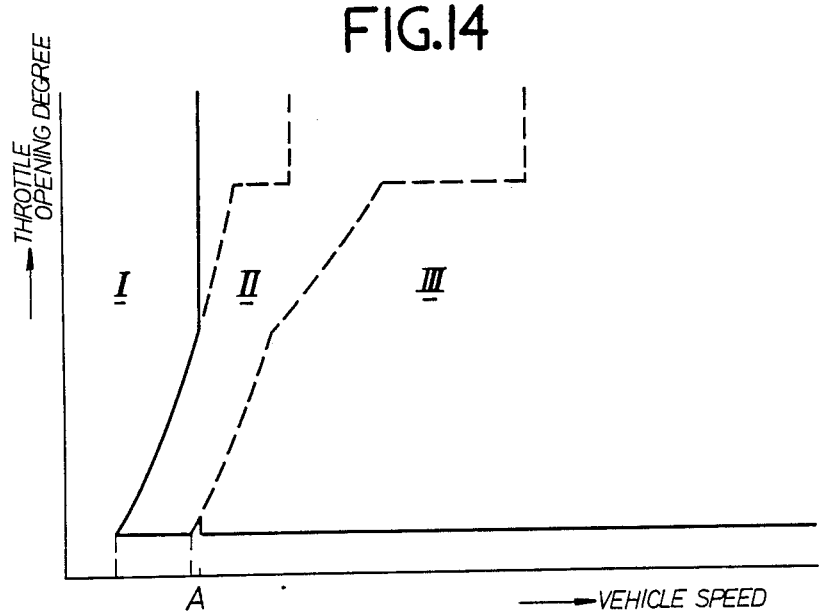
FIG. 14 is a view for explanation of a zone capable of engaged driving of the direct coupling clutch.

In case of the change gear ratio of the high-speed stage, it is limited that the lock-up operation of the direct coupling clutch Cd is effected at a speed above the vehicle speed A, but there practically poses no problem as shown in FIG. 14. That is, in FIG. 14 showing the typical characteristic map of the hydraulic automatic transmission, three zones I, II and III defined by the dotted lines designate the low-speed zone, middle-speed zone and high-speed zone, respectively. Since the zone III of the high-speed zone is limited to the speed above the vehicle speed, there is no actual harm. On the other hand, in the middle-speed zone II, the lock-up operation can be made in its whole zone, and the actual fuel cost is improved. While it is obvious if one assumes the time the vehicle is stopped, when the shift-down is made to the low-speed stage, the lock-up condition is released at a speed below the vehicle speed A. Thus, the possibility of the engine stop can be avoided without using a special switching valve which performs the switching operation in response to the vehicle speed. The horizontal line indicated by the solid lines in FIG. 14 designates the lock-up release line by the action of the ON/OFF valve Vo.

While in this embodiment, the switching of the action of the lubricating oil pressure Pu to the oil passage 295 has been performed by the timing valve Tv, an exclusive-use switching valve for the purpose of such switching can be provided separately from the timing valve Tv. In addition, while the governor pressure Pg and lubricating oil pressure Pu have been introduced into the high-select valve Vs, oil pressure from another oil pressure generating means for generating a substantially fixed oil pressure in response to the operation of the engine E, in place of the lubricating oil pressure Pu, can be introduced into the high-select valve Vs.

Figure 15:
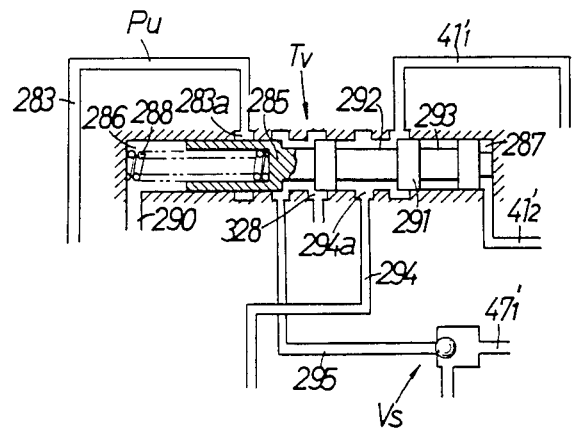
FIG. 15 is an oil pressure circuit view showing essential parts in a modified example of the timing valve in FIG. 12.

FIG. 15 shows another structure of the timing valve. In this timing valve Tv, between a port 283a to which is connected the oil passage 283 and a port 294a to which is connected the oil passage 294 is provided a further port 328 which is in turn communicated with the oil tank R. According to this embodiment, when the valve body 285 is moved rightwards to assume the first switching position, the oil passage 295 is communicated with the oil tank R through the port 328, and the oil pressure of the oil passage 295 is zero. While the function similar to the timing valve Tv in FIG. 12 can be performed even by the timing valve Tv, the timing valve Tv in FIG. 12 can be constructed to be more compact than the other. In the timing valve Tv in FIG. 12, the description has been made such that when the valve body 285 is moved between the first switching position and the second switching position, the oil passage 283 is temporarily communicated with the output oil passage 294 to release the lock-up, but this is limited to the case where the lubricating oil pressure Pu is lower than the internal pressure Pc of the torque converter T. Otherwise, a port 328 in communication with the oil tank R need be provided as in the timing valve Tv in FIG. 15.

The oil passage $41_1'$ branched from the oil passage $41_1$ for supplying the operating oil to the low-speed stage clutch C1 is connected to the timing valve Tv in FIGS. 12 and 15 because the lock-up of the torque converter T is effected only at the drive position D, and in order that said lock-up is effected at the middle-speed retaining position II, the oil passage branched from the oil passage 43 can be connected thereto. While the aforesaid timing valve Tv is made to have the switching function of the lubricating oil pressure Pu, it will be noted that an exclusive-use switching valve for switching the lubricating oil pressure can be provided separately from these timing valves Tv.

Figure 16:
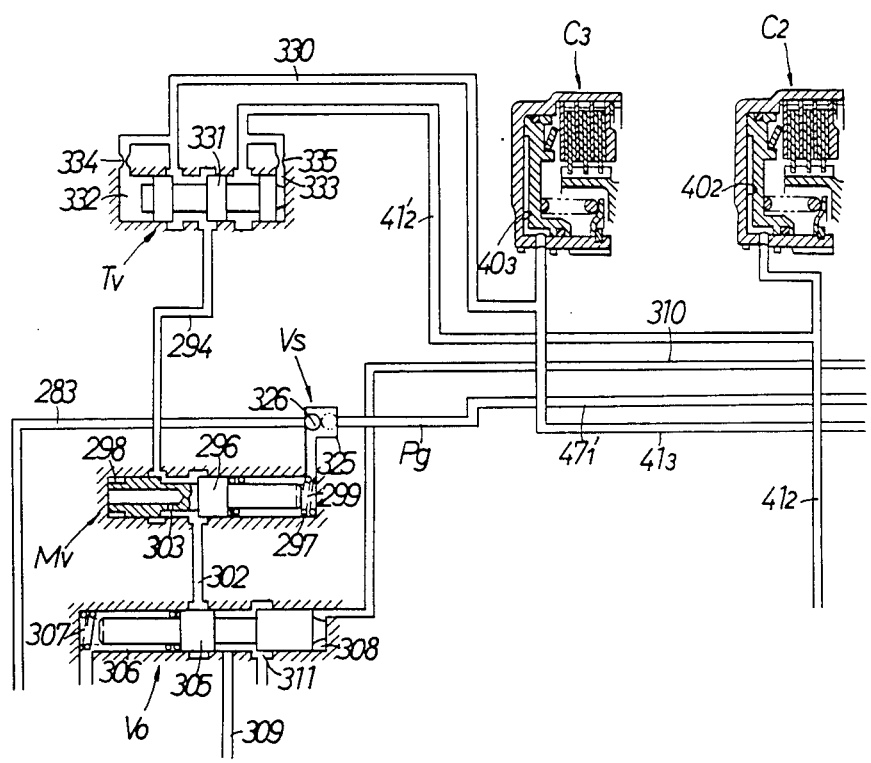
FIGS. 16, 17 and 18 are oil pressure circuit views showing essential parts of a seventh embodiment, an eigth embodiment and a ninth embodiment, respectively, of the present invention.

FIG. 16 shows an embodiment in which the lock-up of the torque converter T is effected only at the time of change gear ratios of the middle-speed stage and high-speed stage. A timing valve Tv is interposed between the oil passage $41_2'$ branched from the oil passage $41_2$ (see FIG. 12) for supplying the operating oil to the manual valve Mv and middle-speed stage clutch $C_2$ and the oil passage $41_3'$ branched from the oil passage $41_3$ for supplying the operating oil to the high-speed stage clutch $C_3$. This timing valve Tv comprises a spool valve body 331 which is moved between a left first switching position and a right second switching position, a first pilot oil pressure chamber 332 to which a left end surface of the valve body 331 faces, and a second pilot oil pressure chamber to which a right end surface of the valve body 331 faces, wherein the first pilot oil pressure chamber 332 is communicated with the oil passage $41_3'$ through a throttle 334, and the second pilot oil pressure chamber 333 is communicated with the oil passage $41_2'$ through a throttle 335. Thus, when the change gear ratio of the middle-speed stage is established, the valve body 331 is in the left first switching position and the oil passage $41_2'$ is communicated with the output oil passage 294. When the change gear ratio of the high-speed stage is established, the valve body 331 is in the right second switching position, and the oil passage $41_3'$ is communicated with the output oil passage 294. Since the lock-up is not effected at the low-speed stage, the oil passage 283 for guiding the lubricating oil pressure Pu is directly connected to the high-select valve Vs. According to this embodiment, when the change gear ratios of the middle-speed stage and high-speed stage are established, torque converter T is locked up, and therefore, this mode is distinguished from the embodiment in connection with FIG. 14 in which the torque converter T is not locked up at a speed below the vehicle speed A.

Figure 17:
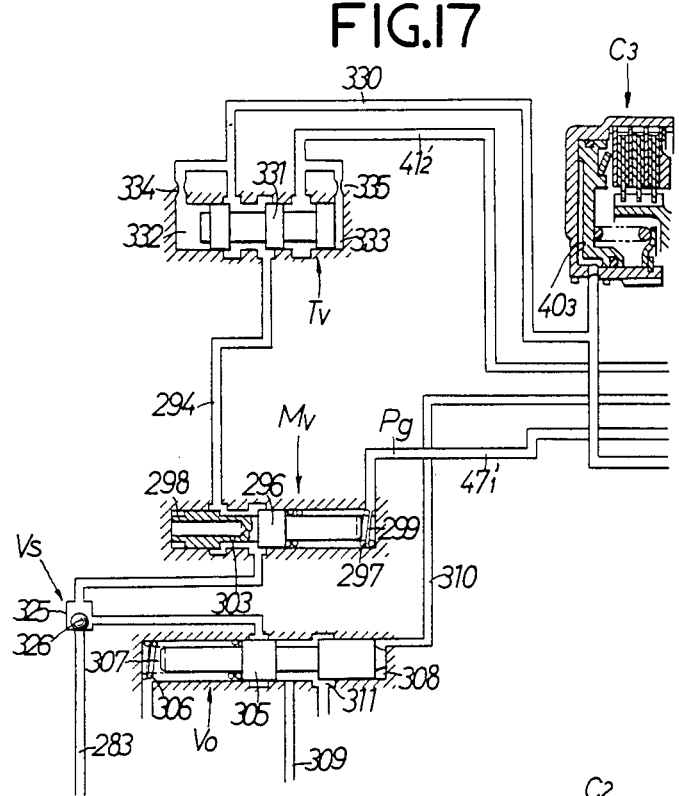

FIG. 17 shows an embodiment in which the lubricating oil pressure Pu is so high that the lock-up may be effected only by itself. In this embodiment, it is not necessary to increase the lubricating oil pressure Pu by the modulator valve Mv. Therefore, the high-select valve Vs is arranged so that the oil pressure of the ouput oil passage 302 from the modulator valve Mv is compared with the oil pressure of the oil passage 283 for guiding the lubricating oil pressure Pu, and the higher oil pressure resulting therefrom is guided to the ON/-OFF valve Vo.

Figure 18:
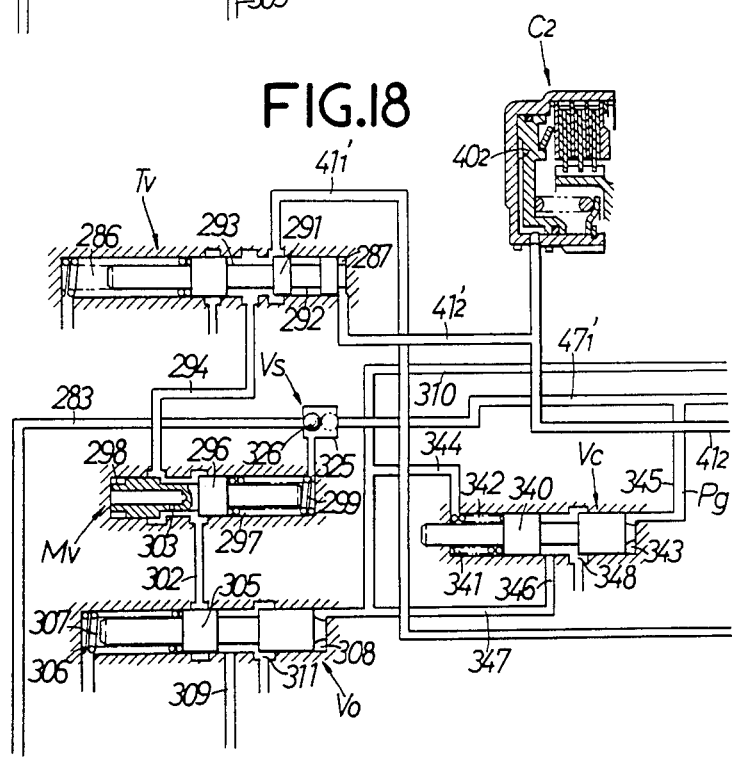

FIG. 18 shows an embodiment in which the operation release of the torque converter T are controlled in response to the vehicle speed. A second pilot oil pressure chamber 308 on the ON/OFF valve Vo is connected to the oil tank R through the switching valve Vc. This switching valve Vc comprises a spool valve body 340 which is moved between a left closed position and a right open position, a spring 341 for biasing the valve body 340 towards the open side, a first pilot oil pressure chamber 342 to which a left end surface of the valve body 340 faces, and a second pilot oil pressure chamber 343 to which a right end surface of the valve body 340 faces. An oil passage 344 branched from an oil passage 310 for guiding the oil pressure proportional to the opening degree of the throttle of the engine E to the second pilot oil pressure chamber 308 of the ON/OFF valve Vo is connected to the first pilot oil pressure chamber 342, and an oil passage 345 branched from the oil passage $47_1'$ for guiding the governor pressure Pg is connected to the second pilot oil pressure chamber 343. The second pilot oil pressure chamber 308 of the ON/-OFF valve Vo is connected to an input port 346 through an oil passage 347, and an output port 348 is connected to the oil tank R.

In accordance with this embodiment, when the vehicle speed lowers, the valve body 340 is moved rightwards to bring the input port 346 into communication with the output port 348, the oil pressure within the second pilot oil pressure chamber 308 is released to the oil tank R to close the ON/OFF valve Vo, and the oil pressure within the cylinder 14 in the direct coupling clutch Cd is released to the oil tank. Accordingly, the lock-up condition of the torque converter T is forcibly released at the time of lowering of the vehicle speed, and therefore, the lock-up zone in the low-speed stage can be enlarged towards the lower speed side.

While in any of the above-described embodiments, the description has been made of the automatic transmission of three stages of forward, it will be noted that in the automatic transmission of four stages of forward, the torque converter T can be locked up at each of change gear stages, namely, the second, third and top. In that case, it is necessary to use an oil pressure source which can be increased at each of change gear stages, namely, the second, third and top but cannot be increased at the change gear stage of low gear. Such an oil pressure source used is the oil pressure of the output oil passage 70 of the low-middle speed shift valve $V_1$.

While in the foregoing, the clutches $C_1$, $C_2$ and $C_3$ are increased in pressure to establish the gear trains $G_1$, $G_2$ and $G_3$, respectively, it will be noted that in case of using brake bands, the clutches are reduced in pressure to establish the gear trains $G_1$, $G_2$ and $G_3$, respectively. It will be apparent that even in such a case as just mentioned, movement of the aforesaid timing valve Tv is merely reversed and the similar operation is obtained.

Moreover, while in the above-described embodiments, the direct coupling clutch Cd used was of the the roller type, it is noted that other types of the direct coupling clutch can be used. For example, the direct coupling clutch includes one which is the disk type with a facing material adhered thereto, which receives the internal pressure of the torque converter T to couple the input and output members. This can be easily applied by an arrangement wherein for example, a timing valve is used as a pilot valve and an original control valve is shifted to an inoperative position.

As described above, in the present invention, there are provided an oil pressure generating means for generating oil pressure of a fixed level in response to the operation of the engine and a selection means for comparing the governor pressure from the governor valve with the oil pressure generated by said oil pressure generating means to select and release a higher oil pressure among them, and the output of the selection means is used as an index for controlling the engaging force of the direct coupling clutch. Therefore, even during the running at the change gear ratio of the low-speed stage, the engaging oil pressure necessary for locking up the torque converter can be secured and the problem of vibrations in the middle-speed zone can be solved to considerably improve the practical fuel cost. Furthermore, if a switching valve is provided to switch a supply of the operating oil pressure to the direct coupling clutch, the zone that may lock up the torque converter is extended to a lower speed zone. Yet, since the direct coupling clutch is of the power divisional type, even if the torque converter is locked up in the low-speed zone, it is not feared that the performacne of power is deteriorated and the vibration of the vehicle body is increased. As a result, the governor pressure can be set so as to have the characteristic most suitable for the change gear to increase the freedom of design.

Moreover, a control means for interrupting between a selecting means and an oil pressure generating means when the gear change ratio of the low-speed stage is established is interposed between the selecting means and the oil pressure generating means. Therefore, the characteristic wherein the governor pressure is rapidly lowered in response to the lowering of the vehicle speed can be utilized to release the lock-up condition of the torque converter in the change gear ratio of the low-speed stage. accordingly, it is possible to extend the lock-up zone to the lower speed zone without occurrence of the engine stop in the low-speed zone, without provision of an exclusive-use switching valve of which switching mode varies with the vehicle speed, and possible to improve the practical fuel cost.

What is claimed is:

1. In the automatic transmission for a vehicle, comprising a fluid type torque converter having an input member and an output member; a hydraulic direct coupling clutch provided between the input and output members and capable of being actuated to mechanically couple both members together; and auxiliary transmission connected to the torque converter and having plural stages of gear trains, the auxiliary transmission being capable of being changed in speed to a plurality of speed ratios by selection of the gear trains; and a control mechanism for automatically effecting the selection of gear trains of the auxiliary transmission in accordance with the running condition of the vehicle, a lock-up control device for the direct coupling clutch comprising:

a valve for controlling the supply of actuating oil pressure from a common oil pressure source to the direct coupling clutch, said valve having a body movable between opposite end position and adapted to take a first switch position at one of said end positions when applied with a single signal pressure and a second switch position at the other of said end positions, after release of the signal pressure, due to resilient force of a spring means, said signal pressure being of such a characteristic that it becomes high when an intermediate gear train is selected to assume a specific gear ratio and it becomes low when higher and lower gear trains adjacent said intermediate gear train are selected to assume corresponding gear ratios adjacent said specific gear ratio, and wherein said valve allows flow of the actuating oil pressure to the direct coupling clutch when the valve body is at both the first and second switch positions and interrupts the flow during shifting movement of the valve body from the first to second positions or vice versa in response to gear shifting operation from said specific gear ratio to its adjacent gear ratios or vice versa, thus causing the direct coupling clutch to be instantaneously disconnected during gear shifting operation over adjacent three gear ratios with use of the single signal pressure.

2. A control device as defined in claim 1, wherein the signal pressure is an operational oil pressure to be used for engagement of an intermediate stage clutch of an intermediate-speed gear train.

3. A control device as defined in claim 1, wherein the oil pressure for actuation of the direct coupling clutch is an operational oil pressure to be used for engagement of a low speed clutch of a low speed gear train.

4. A control device as defined in claim 1, wherein in an oil passage connecting an output port of the valve and an input port of the direct coupling clutch, a modulator valve is interposed which is capable of disconnecting a connection between the input and output ports in response to a travelling condition of the vehicle.

* * * * *